(12) United States Patent
Park et al.

(10) Patent No.: US 11,888,789 B2
(45) Date of Patent: *Jan. 30, 2024

(54) USER EQUIPMENT, PDSCH A/N TRANSMITTING METHOD THEREOF, TRANSMISSION/RECEPTION POINT, AND PDSCH A/N RECEIVING METHOD THEREOF

(71) Applicant: Pantech Corporation, Seoul (KR)

(72) Inventors: Dong Hyun Park, Seoul (KR); Sung Jun Yoon, Seoul (KR)

(73) Assignee: PANTECH CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,890

(22) Filed: Aug. 10, 2022

(65) Prior Publication Data
US 2022/0399985 A1 Dec. 15, 2022

Related U.S. Application Data

(63) Continuation of application No. 17/061,508, filed on Oct. 1, 2020, now Pat. No. 11,424,899, which is a continuation of application No. 16/394,702, filed on Apr. 25, 2019, now Pat. No. 10,805,060, which is a continuation of application No. 15/800,561, filed on Nov. 1, 2017, now abandoned, which is a continuation of application No. 15/014,792, filed on Feb. 3, 2016, now Pat. No. 9,838,194, which is a continuation of application No. 14/513,449, filed on Oct. 14, 2014, now Pat. No. 9,270,365, which is a
(Continued)

(30) Foreign Application Priority Data

Dec. 16, 2011 (KR) .................. 10-2011-0136662
Jan. 30, 2012 (KR) .................. 10-2012-0009275

(51) Int. Cl.
| | | |
|---|---|---|
| H04L 5/14 | (2006.01) | |
| H04L 1/1829 | (2023.01) | |
| H04L 5/00 | (2006.01) | |
| H04W 72/23 | (2023.01) | |
| H04B 7/26 | (2006.01) | |
| H04W 72/0446 | (2023.01) | |

(52) U.S. Cl.
CPC ............ H04L 5/14 (2013.01); H04B 7/2643 (2013.01); H04L 1/1861 (2013.01); H04L 5/001 (2013.01); H04L 5/0055 (2013.01); H04L 5/1469 (2013.01); H04W 72/0446 (2013.01); H04W 72/23 (2023.01)

(58) Field of Classification Search
None
See application file for complete search history.

(56) References Cited

U.S. PATENT DOCUMENTS

| | | | | |
|---|---|---|---|---|
| 8,873,519 B2 * | 10/2014 | Park | ...................... | H04L 5/0055 370/336 |
| 9,270,365 B2 * | 2/2016 | Park | ...................... | H04L 1/1861 |
| 9,800,375 B2 * | 10/2017 | Li | .......................... | H04L 1/1835 |

(Continued)

*Primary Examiner* — Anh Vu H Ly
(74) *Attorney, Agent, or Firm* — Ladas & Parry, LLP

(57) ABSTRACT

The present invention relates to a system that includes a transmission/reception point and a user equipment having different configurations in inter-band and performs a TDD (Time Division Duplex) method.

8 Claims, 17 Drawing Sheets

Related U.S. Application Data continuation of application No. 13/715,278, filed on Dec. 14, 2012, now Pat. No. 8,873,519.

(56) References Cited

U.S. PATENT DOCUMENTS

| | | | |
|---|---|---|---|
| 9,838,194 B2* | 12/2017 | Park | H04L 1/1861 |
| 10,805,060 B2* | 10/2020 | Park | H04L 5/0055 |
| 11,424,899 B2* | 8/2022 | Park | H04B 7/2643 |
| 2013/0336267 A1* | 12/2013 | Li | H04L 5/14 |
| | | | 370/329 |
| 2014/0022967 A1* | 1/2014 | Yang | H04L 5/0055 |
| | | | 370/280 |
| 2014/0056184 A1* | 2/2014 | Yang | H04L 1/1861 |
| | | | 370/280 |
| 2014/0126433 A1* | 5/2014 | Yang | H04L 1/0027 |
| | | | 370/280 |

* cited by examiner

USER EQUIPMENT, PDSCH A/N TRANSMITTING METHOD THEREOF, TRANSMISSION/RECEPTION POINT, AND PDSCH A/N RECEIVING METHOD THEREOF

CROSS-REFERENCE TO RELATED APPLICATIONS

This application is a continuation of U.S. patent application Ser. No. 17/061,508, filed on Oct. 1, 2020, which is a continuation of U.S. patent application Ser. No. 16/394,702, filed on Apr. 25, 2019, now issued as U.S. Pat. No. 10,805,060, which is a continuation of U.S. patent application Ser. No. 15/800,561, filed on Nov. 1, 2017, which is a continuation of U.S. patent application Ser. No. 15/014,792, filed on Feb. 3, 2016, now issued as U.S. Pat. No. 9,838,194, which is a continuation application of U.S. patent application Ser. No. 14/513,449, filed on Oct. 14, 2014, now issued as U.S. Pat. No. 9,270,365, which is a continuation application of U.S. patent application Ser. No. 13/715,278, filed on Dec. 14, 2012, now issued as U.S. Pat. No. 8,873,519, and claims priority from and the benefit under 35 U.S.C. § 119(a) of Korean Patent Application No. 10-2011-0136662, filed on Dec. 16, 2011 and Korean Patent Application No. 10-2012-0009275, filed on Jan. 30, 2012, all of which are hereby incorporated by reference for all purposes as if fully set forth herein.

BACKGROUND

1. Field

The present disclosure relates to a system in which a transmission/reception point and a user equipment have different configurations in an inter-band and perform communication by TDD (Time Division Duplex) method.

2. Discussion of the Background

As communication systems have been advanced, companies and consumers such as individuals come to use a great variety of wireless user equipments. The current mobile communication system of 3GPP series, such as the LTE (Long Term Evolution), and LTE-A (LTE Advanced), requires technology developments capable of providing high-capacity data equivalent to a wire communication network as a high-speed, large-capacity communication system that can transmit/receive various kinds of data, such as moving images, and wireless data out of services devoted to a sound. As a method for transmitting high-capacity data, a method of effectively transmitting data through a large number of component carriers may be used.

Meanwhile, in a TDD (Time Division Duplex) system, it is possible to transmit and receive data by dividing transmission (Tx) or reception (Rx) into time slots and using specific frequency bands. In this scheme, timings for transmitting response information with respect to the data reception can be changed according to a method of configuring an uplink (UL) and a downlink (DL) in a TDD system.

Meanwhile, in a carrier aggregation (CA) environment for aggregating one or more component carriers (CCs), a band corresponding to each component carrier can be different. That is, in inter-band carrier aggregation scheme, component carriers in different operating bands are aggregated. When the carrier aggregation is performed by an inter-band carrier aggregating method, if the TDD configurations of respective bands are different, it should be considered for a timing at which the response information with respect to the data reception is transmitted. The timing for transmitting the response information with respect to the data reception should be able to be applied to both a scheme in which the user equipment is in a full-duplex mode and a scheme in which the user equipment is in a half-duplex mode.

SUMMARY

Exemplary embodiments of the present invention provide a method and an apparatus for determining timings for transmitting response information with respect to data reception when two component carriers have different TDD configurations in a carrier aggregation environment.

Additional features of the invention will be set forth in the description which follows, and in part will be apparent from the description, or may be learned by practice of the invention.

Exemplary embodiments of the present invention provide a user equipment that is configured with at least two serving cells including a primary cell (PCell) and a secondary cell (SCell). The PCell and the SCell have different TDD UL-DL configurations. The user equipment includes a transmitter configured to transmit first acknowledgement/negative acknowledgement (A/N) in an uplink subframe determined by a reference TDD configuration for the SCell. The first A/N corresponds to a Physical Downlink Shared Channel (PDSCH) transmission on the SCell. The reference TDD configuration for the SCell has a greatest number of uplink subframes from among one or more reference TDD configurations for the TDD UL-DL configurations of the PCell and the SCell in Table 1 below:

TABLE 1

| Reference TDD configuration | | PCell TDD UL-DL configuration | | | | | | |
|---|---|---|---|---|---|---|---|---|
| | | 0 | 1 | 2 | 3 | 4 | 5 | 6 |
| SCell TDD UL-DL configuration | 0 | 0 | 1, 2, 4, 5 | 2, 5 | 3, 4, 5 | 4, 5 | 5 | 1, 2, 3, 4, 5, 6 |
| | 1 | 1, 2, 4, 5 | 1 | 2, 5 | 4, 5 | 4, 5 | 5 | 1, 2, 4, 5 |
| | 2 | 2, 5 | 2, 5 | 2 | 5 | 5 | 5 | 2, 5 |
| | 3 | 3, 4, 5 | 4, 5 | 5 | 3 | 4, 5 | 5 | 3, 4, 5 |
| | 4 | 4, 5 | 4, 5 | 5 | 4, 5 | 4 | 5 | 4, 5 |
| | 5 | 5 | 5 | 5 | 5 | 5 | 5 | 5 |
| | 6 | 1, 2, 3, 4, 5, 6 | 1, 2, 4, 5 | 2, 5 | 3, 4, 5 | 4, 5 | 5 | 6 | in Table 1 above, each reference TDD configuration indicates downlink association set indexes (K: {$k_0, k_1, \ldots k_{M-1}$}) for a subframe 'n' as defined in Table 2 below:

TABLE 2

| UL-DL Configuration | Subframe 'n' | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — | where A/N corresponding to PDSCH transmitted in a subframe ($n-k_i$) ($0 \leq i \leq M-1$) is transmitted in the subframe 'n'.

Exemplary embodiments of the present invention provide a method for transmitting A/N by a user equipment configured with at least two serving cells including a primary cell (PCell) and a secondary cell (SCell). The PCell and the SCell have different TDD UL-DL configurations. The method includes transmitting first A/N in an uplink subframe determined by a reference TDD configuration for the SCell. The first A/N corresponds to a physical downlink shared channel (PDSCH) transmission on the SCell. The reference TDD configuration for the SCell has a greatest number of uplink subframes from among one or more reference TDD configurations for the TDD UL-DL configurations of the PCell and the SCell in Table 1 below:

TABLE 1

| Reference TDD configuration | | PCell TDD UL-DL configuration | | | | | | |
|---|---|---|---|---|---|---|---|---|
| | | | 0 | 1 | 2 | 3 | 4 | 5 | 6 |
| SCell TDD UL-DL configuration | 0 | 0 | 1, 2, 4, 5 | 2, 5 | 3, 4, 5 | 4, 5 | 5 | 1, 2, 3, 4, 5, 6 |
| | 1 | 1, 2, 4, 5 | 1 | 2, 5 | 4, 5 | 4, 5 | 5 | 1, 2, 4, 5 |
| | 2 | 2, 5 | 2, 5 | 2 | 5 | 5 | 5 | 2, 5 |
| | 3 | 3, 4, 5 | 4, 5 | 5 | 3 | 4, 5 | 5 | 3, 4, 5 |
| | 4 | 4, 5 | 4, 5 | 5 | 4, 5 | 4 | 5 | 4, 5 |
| | 5 | 5 | 5 | 5 | 5 | 5 | 5 | 5 |
| | 6 | 1, 2, 3, 4, 5, 6 | 1, 2, 4, 5 | 2, 5 | 3, 4, 5 | 4, 5 | 5 | 6 | in Table 1 above, each reference TDD configuration indicates downlink association set indexes (K: {$k_0, k_1, \ldots k_{M-1}$}) for a subframe 'n' as defined in Table 2 below:

TABLE 2

| UL-DL Configuration | Subframe 'n' | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — | where A/N corresponding to PDSCH transmitted in a subframe $(n-k_i)$ $(0 \leq i \leq M-1)$ is transmitted in the subframe 'n'.

Exemplary embodiments of the present invention provide a transmission/reception point that communicates with a user equipment configured with at least two serving cells including a primary cell (PCell) and a secondary cell (SCell). The PCell and the SCell have different TDD UL-DL configurations. The transmission/reception point includes a receiver configured to receive first A/N from the user equipment in an uplink subframe determined by a reference TDD configuration for the SCell. The first A/N corresponds to a physical downlink shared channel (PDSCH) transmission on the SCell. The reference TDD configuration for the SCell has a greatest number of uplink subframes from among one or more reference TDD configurations for the TDD UL-DL configurations of the PCell and the SCell in Table 1 below:

TABLE 1

| Reference TDD configuration | | PCell TDD UL-DL configuration | | | | | | |
|---|---|---|---|---|---|---|---|---|
| | | 0 | 1 | 2 | 3 | 4 | 5 | 6 |
| SCell TDD UL-DL configuration | 0 | 0 | 1, 2, 4, 5 | 2, 5 | 3, 4, 5 | 4, 5 | 5 | 1, 2, 3, 4, 5, 6 |
| | 1 | 1, 2, 4, 5 | 1 | 2, 5 | 4, 5 | 4, 5 | 5 | 1, 2, 4, 5 |
| | 2 | 2, 5 | 2, 5 | 2 | 5 | 5 | 5 | 2, 5 |
| | 3 | 3, 4, 5 | 4, 5 | 5 | 3 | 4, 5 | 5 | 3, 4, 5 |
| | 4 | 4, 5 | 4, 5 | 5 | 4, 5 | 4 | 5 | 4, 5 |
| | 5 | 5 | 5 | 5 | 5 | 5 | 5 | 5 |
| | 6 | 1, 2, 3, 4, 5, 6 | 1, 2, 4, 5 | 2, 5 | 3, 4, 5 | 4, 5 | 5 | 6 | in Table 1 above, each reference TDD configuration indicates downlink association set indexes (K: $\{k_0, k_1, \ldots k_{M-1}\}$) for a subframe 'n' as defined in Table 2 below:

TABLE 2

| UL-DL Configuration | Subframe 'n' | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — | where A/N corresponding to PDSCH transmitted in a subframe $(n-k_i)$ $(0 \leq i \leq M-1)$ is transmitted in the subframe 'n'.

Exemplary embodiments of the present invention provide a method for receiving A/N by a transmission/reception point that communicates with a user equipment configured with at least two serving cells including a primary cell (PCell) and a secondary cell (SCell). The PCell and the SCell have different TDD UL-DL configurations. The method includes receiving first A/N from the user equipment in an uplink subframe determined by a reference TDD configuration for the SCell. The first A/N corresponds to a physical downlink shared channel (PDSCH) transmission on the SCell. The reference TDD configuration for the SCell has a greatest number of uplink subframes from among one or more reference TDD configurations for the TDD UL-DL configurations of the PCell and the SCell in Table 1 below:

TABLE 1

| Reference TDD configuration | | PCell TDD UL-DL configuration | | | | | | |
|---|---|---|---|---|---|---|---|---|
| | | 0 | 1 | 2 | 3 | 4 | 5 | 6 |
| SCell TDD UL-DL configuration | 0 | 0 | 1, 2, 4, 5 | 2, 5 | 3, 4, 5 | 4, 5 | 5 | 1, 2, 3, 4, 5, 6 |
| | 1 | 1, 2, 4, 5 | 1 | 2, 5 | 4, 5 | 4, 5 | 5 | 1, 2, 4, 5 |
| | 2 | 2, 5 | 2, 5 | 2 | 5 | 5 | 5 | 2, 5 |
| | 3 | 3, 4, 5 | 4, 5 | 5 | 3 | 4, 5 | 5 | 3, 4, 5 |

TABLE 1-continued

| Reference TDD configuration | PCell TDD UL-DL configuration | | | | | | |
|---|---|---|---|---|---|---|---|
| | 0 | 1 | 2 | 3 | 4 | 5 | 6 |
| 4 | 4, 5 | 4, 5 | 5 | 4, 5 | 4 | 5 | 4, 5 |
| 5 | 5 | 5 | 5 | 5 | 5 | 5 | 5 |
| 6 | 1, 2, 3, 4, 5, 6 | 1, 2, 4, 5 | 2, 5 | 3, 4, 5 | 4, 5 | 5 | 6 | in Table 1 above, each reference TDD configuration indicates downlink association set indexes (K: $\{k_0, k_1, \ldots k_{M-1}\}$) for a subframe 'n' as defined in Table 2 below:

TABLE 2

| UL-DL Configuration | Subframe 'n' | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — | where A/N corresponding to PDSCH transmitted in a subframe $(n-k_i)$ $(0 \leq i \leq M-1)$ is transmitted in the subframe 'n'.

According to aspects of the present invention, if the TDD configurations of two component carriers are different in a carrier aggregation environment, a timing for transmitting response information with respect to a data reception can be determined.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
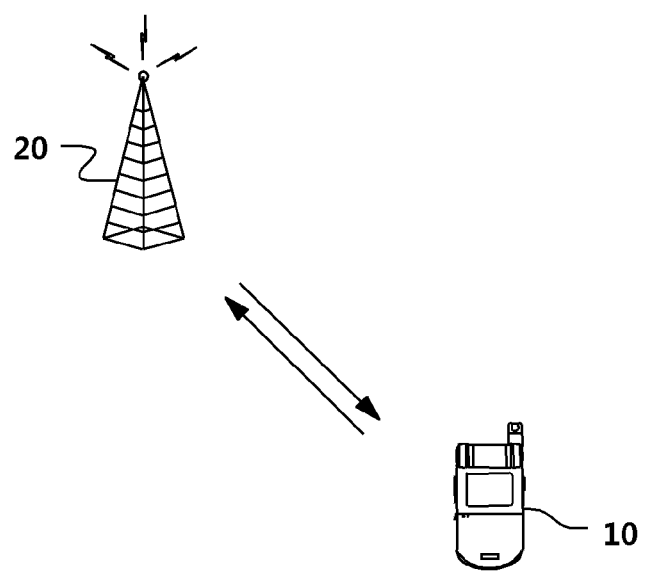
FIG. 1 is a diagram illustrating a wireless communication system according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

FIG. 1 is a diagram illustrating a wireless communication system according to an exemplary embodiment of the present invention.

The wireless communication system may provide various communication services, such as voice communications or packet data communications.

With reference to FIG. 1, the wireless communication system includes a user equipment (UE) 10 and a transmission/reception point 20 that performs uplink and downlink communications with the user equipment 10.

In the present disclosure, the user equipment 10 may be a user equipment in a wireless communication system, and it is to be understood that the user equipment 10 includes a UE (User Equipment) in WCDMA, LTE, HSPA, and the like, and also includes an MS (Mobile Station), a UT (User Terminal), a SS (Subscriber Station), a wireless device, or the like in GSM.

A transmission/reception point 20 or a cell generally refers to a station for communication with the user equipment 10, and it may be also referred to as an access point (AP), a base station (BS), a node-B, an eNB (evolved Node-B), a sector, a site, a BTS (Base Transceiver System), an access point, a relay node, and the like.

That is, in the present specification, it is to be understood that the transmission/reception point 20 or a cell may indicate a partial region or function which is covered by a BSC (Base Station Controller) in a cell or CDMA, a NodeB in WCDMA, or an eNB or a sector (site) in LTE, and the transmission/reception point 20 may have various coverage regions, such as a megacell, a macrocell, a microcell, a pico cell, a femto cell, an RRH (Radio Resource Head), and a relay node communication range.

In the present disclosure, the user equipment 10 and the transmission/reception point 20 are two exemplary communication devices used for implementing a technology or a technical idea described in the present disclosure in uplink/downlink communications, and scope of the invention is not limited by particularly designated terms or words for the communication devices.

FIG. 1 illustrates one user equipment 10 and one transmission/reception point 20, but aspects of the present invention are not limited thereto. One transmission/reception point 20 can communicate with a plurality of the user equipments 10, and also one user equipment 10 can communicate with a plurality of the transmission/reception point 20.

Various multiple access communication methods may be applied to the wireless communication system. Various multiple access communication methods, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA can be used. Exemplary embodiments of the present invention may be applied to the resource allocation for asynchronous wireless communication that evolves through GSM, WCDMA and HSPA to LTE and LTE-advanced, or synchronous wireless communication that evolves to CDMA, CDMA-2000, and UMB, or the like. Exemplary embodiments of the present invention are not to be limited to a particular wireless communication field, and are to be construed to include all the technical fields to which the idea of the present invention can be applied.

The uplink transmission and the downlink transmission may be performed by using a TDD (Time Division Duplex) method in which the transmissions are performed at different timings or an FDD (Frequency Division Duplex) method in which the transmissions are performed at different frequencies.

With reference to FIG. 1, the user equipment 10 and the transmission/reception point 20 may perform uplink and downlink wireless communications.

In the wireless communication, one wireless frame (radio frame) may include 10 subframes, and one subframe may include two slots. The wireless frame may have a duration of 10 ms, and the subframe may have a duration of 1.0 ms. In general, the base unit for data transmission in time domain may be one subframe, and downlink or uplink scheduling is performed by the subframe unit.

The transmission/reception point 20 may perform a downlink transmission to the user equipment 10. The transmission/reception point 20 may transmit data via a physical downlink shared channel (PDSCH) as a downlink data channel for a unicast transmission. Further, the transmission/reception point 20 may transmit a control channel, such as a physical downlink control channel (PDCCH) as a downlink channel used for transmitting downlink control information (DCI), such as a scheduling required for PDSCH reception, and downlink control information (DCI) including scheduling grant information for a transmission in the uplink data channel (for example, a physical uplink shared channel (PUSCH)), a physical control format indicator channel (PCFICH) for transmitting indicators that divide regions of PDSCH and PDCCH, and a physical HARQ indicator channel (PHICH) for transmitting the HARQ (Hybrid Automatic Repeat request) confirmation on the uplink transmission. Hereinafter, the transmission/reception of a signal through each channel will be described as transmitting/receiving the corresponding channel.

The user equipment 10 may perform an uplink transmission to the transmission/reception point 20. The user equipment 10 may transmit PUSCH as an uplink data channel. Further, the user equipment 10 may transmit HARQ ACK (acknowledgement)/NACK (negative ACK) indicating whether the downlink transmission block is successfully received and a physical uplink control channel (PUCCH) as an uplink control channel used for transmitting uplink control information (UCI) including a scheduling request that demands resource allocation if the channel state report and the uplink data transmission is desired.

Meanwhile, in TDD, time points for uplink and downlink are divided, and if there are various TDD configurations, the points may vary.

Table 1 presents a TDD configuration. Each TDD configuration has different UL-DL (Uplink-Downlink) subframe transmission timing. Such a TDD configuration may be a cell-specific configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, in radio frame corresponding to 10 subframes, regions indicated by D represent downlink subframes, and regions indicated by U represents uplink subframes. S represents a subframe that switches from downlink to uplink (Downlink-to-Uplink Switch-point). For example, if a TDD UL-DL (uplink-downlink) configuration is 1, a subframe having a subframe number 0, 4, 5, or 9 is a downlink subframe, a subframe having a subframe number 2, 3, 7, or 8 is an uplink subframe, and a subframe having a subframe number 1 or 6 is a subframe that switches from downlink to uplink.

Meanwhile, if one of the TDD UL-DL configurations is used, the user equipment can know in advance uplink points and downlink points. Such information enables the user equipment to perform operations in advance by predicting the uplink, downlink, and switching subframes.

A response for a downlink data transmission, e.g., A/N (Ack/Nack) for PDSCH, is transmitted through an uplink frame from the user equipment 10 to the transmission/reception point 20. For an uplink subframe in which A/N for PDSCH is transmitted from the user equipment 10, downlink association set indexes (K: $\{k_0, k_1, \ldots k_{M-1}\}$) indicate an association value associated with a downlink subframe in which the PDSCH is transmitted to the user equipment 10. For each UL-DL configuration, the downlink association set indexes 'K' for an uplink subframe 'n' are shown in Table 2 below.

frame 0 to subframe 9, the subframe numbers 5 and 6 in the previous radio frame correspond to '2−7'=−5 and '2−6'=−4, respectively). If a subframe number 'n' is 3, and K={4}, A/N for PDSCH transmitted in a downlink subframe having the subframe number 9 in the previous radio frame is transmitted in the subframe '3'. If a subframe number 'n' is 7, and K={7, 6}, A/N for PDSCH transmitted in downlink subframes having subframe numbers 0 and 1 of the same radio frame is transmitted in the subframe '7'. Further, when the subframe number is 8, and K={4}, A/N of PDSCH transmitted in a downlink subframe having a subframe number 4 of the same radio frame is transmitted through the subframe '8'.

Meanwhile, in a carrier aggregation (CA) environment in which one or more component carriers (CC) are aggregated, bands including respective component carriers may be different. If the carrier aggregation is performed by an inter-band method, a TDD configuration for each band may be different from each other. However, carrier waves included in bands having different TDD configurations may be used in one user equipment.

Figure 2:
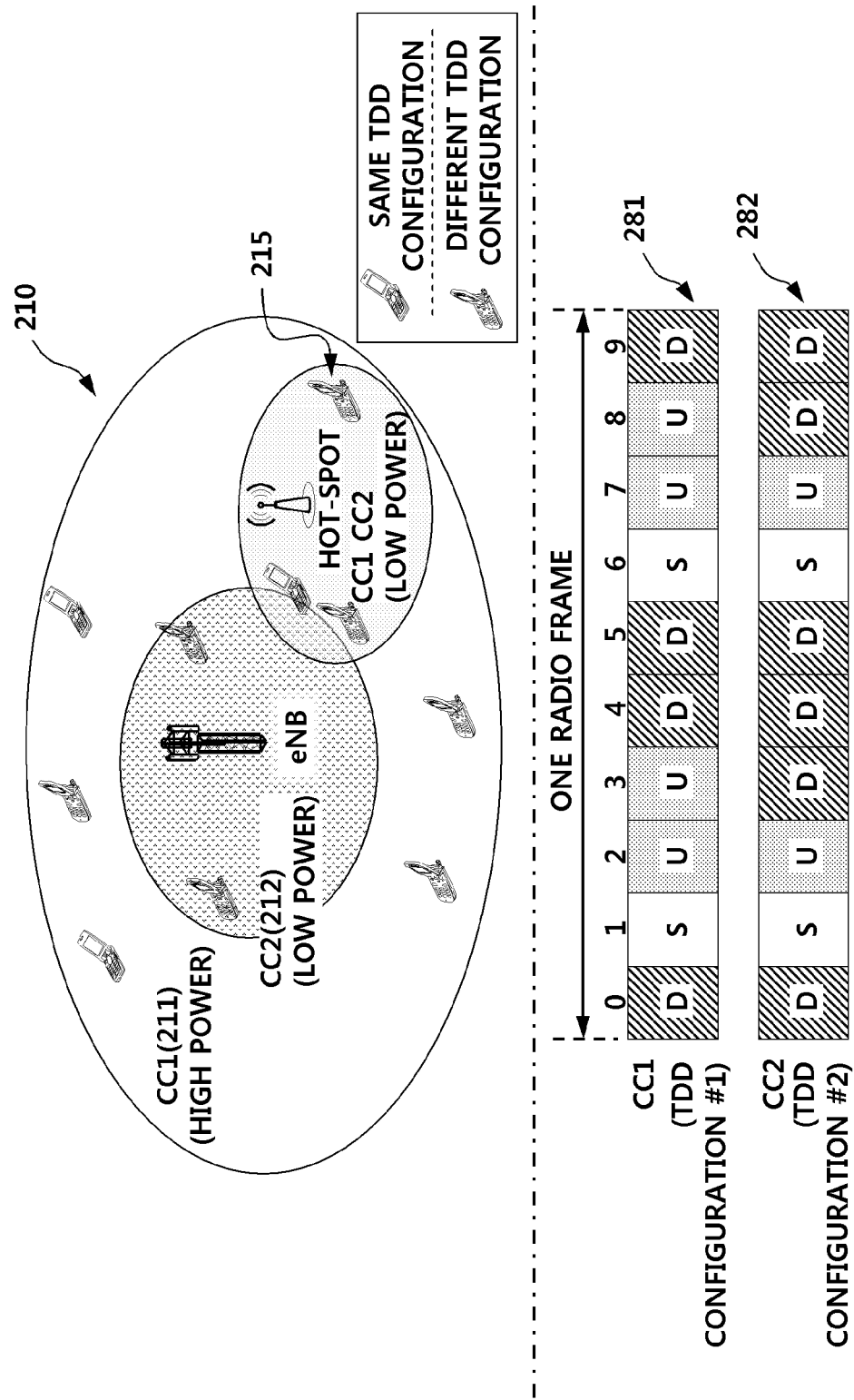
FIG. 2 is a diagram illustrating an inter-band CA environment according to an exemplary embodiment of the present invention.

FIG. 2 is a diagram illustrating an inter-band CA environment according to an exemplary embodiment of the present invention.

It is illustrated that two component carriers are configured in a system 210, where a CC1 211 is a carrier wave that has a coverage of a high-powered signal transmitted from an

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For an uplink subframe 'n' in each TDD UL-DL configuration, an index $k_i$ in Table 2 indicates the number of subframes counted from the uplink subframe (subframe 'n') for transmitting A/N for PDSCH to a downlink subframe, which is located before the uplink subframe, for transmitting the PDSCH. That is, with respect to the PDSCH transmitted in the downlink subframe (n−k) (k∈K), A/N for the PDSCH is transmitted in an uplink subframe 'n'. For example, it is assumed that a TDD UL-DL configuration is 1. If a subframe number 'n' is 2, and K={7, 6}, A/N for PDSCH transmitted in downlink subframes having subframe numbers 5 and 6 in the previous radio frame is transmitted through the subframe '2'. (If one radio frame includes ten subframes from subeNB, and the CC2 212 is a carrier wave that has a coverage of a low-powered signal transmitted from the eNB. The CC1 211 and the CC2 212 may be included in different bands. The TDD UL-DL configuration of the CC1 211, which is denoted by "1" in Table 1, is denoted by "281" in FIG. 2, and the TDD UL-DL configuration of the CC2 212, which is denoted by "2" in Table 1, is denoted by "282" in FIG. 2. In this environment, a CA configuration may be possible for user equipments located in the coverage of CC2 212. Further, a hot-spot region 215 may be configured by the CA environment of the CC1 211 and the CC2 212.

In the CA environment, the user equipment that communicates with the transmission/reception point may perform a communication via CCs that have different TDD configurations (for example, the CC1 211 and the CC2 212).

For example, different TDD UL-DL configurations may be used in inter-band for the purpose of traffic adaptation.

Figure 3:
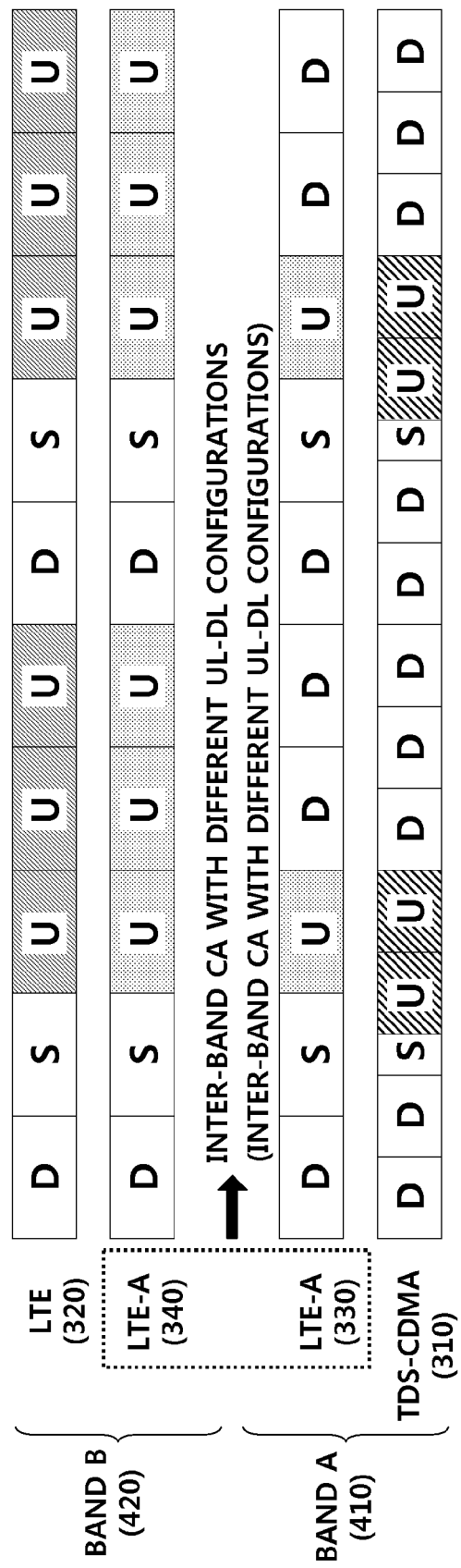
FIG. 3 is a diagram illustrating an example of requiring different TDD UL-DL configurations in an inter-band in order to avoid an interference with different TDD systems according to an exemplary embodiment of the present invention.

In another example, with reference to FIG. 3, the TDD uplink-downlink of a TDD system (for example, the LTE-A 330 and 340) is configured in order to avoid interferences with different TDD systems (for example, the TDS-CDMA 310 or the LTE 320) that exist in a same band, so different TDD UL-DL configurations may be applied for the TDD system in the inter-band. That is, in the example of FIG. 3, in a band A 410, the LTE-A 330 has a TDD UL-DL configuration of "2" in order to avoid an interference with the TDS-CDMA 310, and in a band B 420, the LTE-A 340 has a TDD UL-DL configuration of "0" in order to avoid an interference with the LTE 320, so the LTE-A 330 and the LTE-A 340 that are located in different bands may have different TDD UL-DL configurations.

Further, in a low frequency band, a TDD UL-DL configuration having more uplink subframes may be used, and in a high frequency band, a TDD UL-DL configuration having more downlink subframes may be used. This configuration may enhance the coverage increase.

The examples described above may influence the peak throughput.

In this case, the operation method may be different subframe by subframe depending on whether the transmission mode, which can be supported on a conflicting subframe, is a half-duplex mode or a full-duplex mode. The conflicting subframe may occur if a user equipment adopts different TDD configurations in the inter-band configuration.

Figure 4:
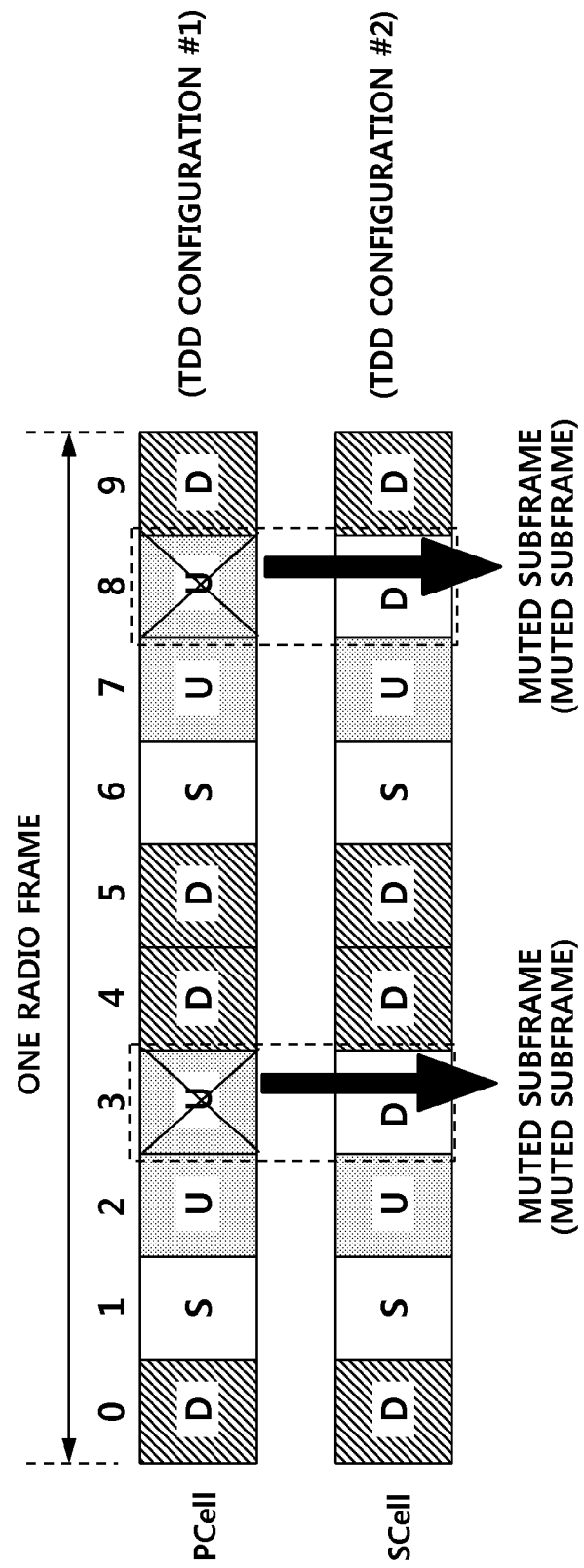
FIG. 4 is a diagram illustrating an operation method of each subframe when a user equipment in an inter-band CA environment of FIG. 2 is in a half-duplex mode according to an exemplary embodiment of the present invention.

FIG. 4 is a diagram illustrating operation methods for each subframe when a transmission mode is a half-duplex mode in a conflicting subframe that may occur if a user equipment adopts different TDD configurations in the inter-band configuration in an inter-band CA environment of FIG. 2. In the example of FIG. 4, a PCell (Primary Cell) has a TDD UL-DL configuration "1" and an SCell (Secondary Cell) has a TDD UL-DL configuration "2". In FIG. 4, U denotes a subframe dedicated for an uplink transmission, D denotes a subframe dedicated for a downlink transmission, and S denotes a special subframe in which a downlink transmission switches to an uplink transmission.

With reference to FIG. 4, if the subframe number is 3 or 8, the PCell has an uplink configuration, and the SCell has a downlink configuration. Hereinafter, the subframes in which the CCs have different uplink/downlink are referred to as conflicting subframes. Since the user equipment is in a half-duplex mode, at least one of an uplink subframe of the PCell and a downlink subframe of the SCell operates as a muted subframe. In the example of FIG. 4, when the subframe number is 3 or 8, the uplink subframe of the PCell is a muted subframe.

A physical uplink control channel (PUCCH) that includes A/N for PDSCH (PDSCH A/N) may be transmitted only by the PCell. Hereinafter, A/N for PDSCH (A/N with respect to PDSCH) may be referred to as 'PDSCH A/N'. If an uplink subframe in a PCell for transmitting PDSCH A/N is a muted subframe, an event in which the PDSCH A/N cannot be transmitted in the uplink subframe may occur.

In the example of FIG. 4, since the TDD UL-DL configuration of the PCell is "1", PDSCH A/N can be transmitted in a subframe when the subframe number is 2, 3, 7, or 8, with reference to Table 2. However, when the subframe number is 3 or 8, if the uplink subframe of CC1 is a muted subframe, PDSCH A/N cannot be transmitted in the subframe having the subframe number 3 for PDSCH transmitted in a downlink subframe having the subframe number 9 in the previous radio frame, and PDSCH A/N cannot be transmitted in the subframe having the subframe number 8 for PDSCH transmitted in a downlink subframe having the subframe number 4 of the same radio frame.

Figure 5:
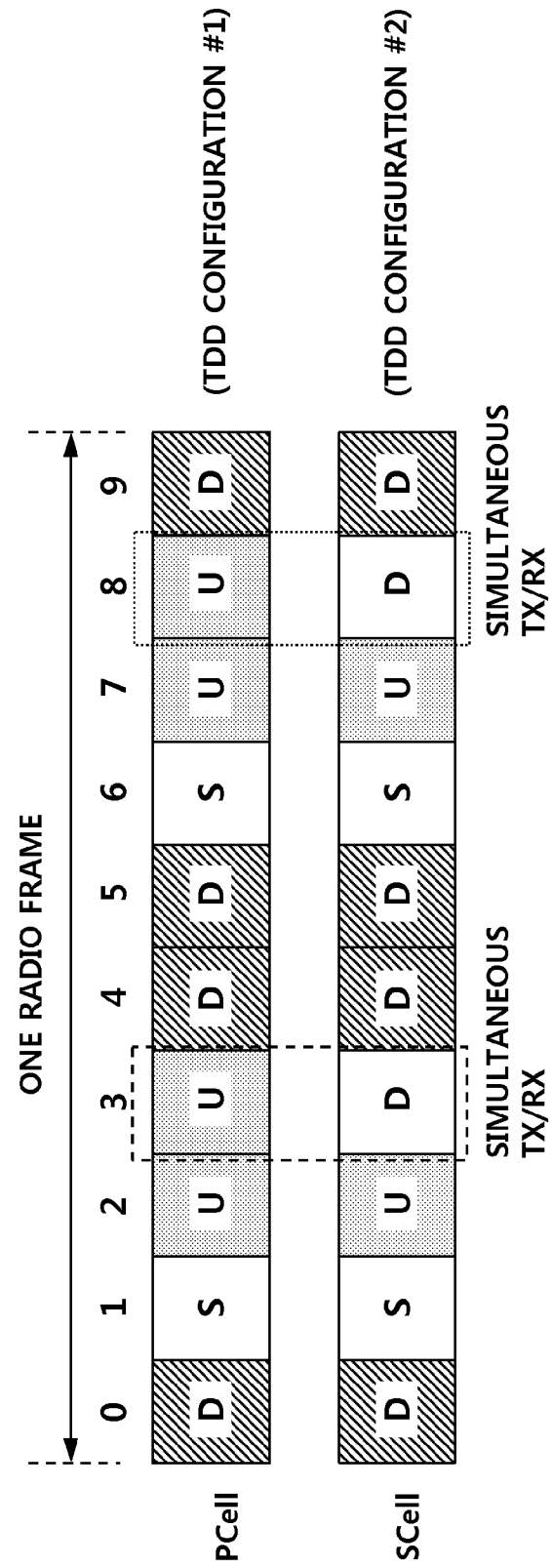
FIG. 5 is a diagram illustrating an operation method for each subframe when a user equipment in an inter-band CA environment of FIG. 2 is in a full-duplex mode.

FIG. 5 is a diagram illustrating an operation method for each subframe when a user equipment in an inter-band CA environment is in a full-duplex mode. In FIG. 5, a PCell has a TDD UL-DL configuration "1" and an SCell has a TDD UL-DL configuration "2". In FIG. 5, U denotes a subframe dedicated for an uplink transmission, D denotes a subframe dedicated for a downlink transmission, and S denotes a special subframe in which a downlink transmission switches to an uplink transmission.

With reference to FIG. 5, when the subframe number is 3 or 8, the PCell has an uplink configuration and the SCell has a downlink configuration. Since the user equipment is in a full-duplex mode in a conflicting subframe that may occur if the user equipment adopts different TDD configurations in the inter-band configuration, the user equipment may transmit an uplink signal through the PCell even in the conflicting subframe and receive a downlink signal through the SCell even in the conflicting subframe simultaneously. The PUCCH including PDSCH A/N may be transmitted only through the PCell. However, an event in which PDSCH A/N cannot be transmitted for PDSCH transmitted in a specific downlink subframe may occur.

In the example of FIG. 5, since the TDD UL-DL configuration of the PCell is "1", PDSCH A/N can be transmitted in a subframe when the subframe number is 2, 3, 7, or 8, with reference to Table 2. More specifically, with reference to Table 2, when the uplink subframe number is 2, K={7, 6}. Thus, PDSCH A/N can be transmitted in the uplink subframe '2' for PDSCH transmitted in a downlink subframe having a subframe number 5 or 6 of the previous radio frame. When the uplink subframe number is 3, K={4}. Thus, PDSCH A/N can be transmitted in the uplink subframe '3' for PDSCH transmitted in a downlink subframe having a subframe number 9 of the previous radio frame. When the uplink subframe number is 7, K={7, 6}, so the PDSCH A/N can be transmitted in the uplink subframe '7' for PDSCH transmitted in a downlink subframe having a subframe number 0 or 1 of the same radio frame. When the uplink subframe number is 8, K={4}. Thus, PDSCH A/N can be transmitted in the uplink subframe '8' for PDSCH transmitted in a downlink subframe having a subframe number 4 of the same radio frame. In a nutshell, through the subframe numbers 2, 3, 7, and 8, PDSCH A/N can be transmitted for PDSCH transmitted in a downlink subframe having a subframe number 0, 1, 4, 5, 6, or 9.

Meanwhile, since the TDD UL-DL configuration of the SCell is "2", PDSCH can be transmitted by a downlink transmission in a subframe when the subframe number is 0, 1, 3, 4, 5, 6, 8, or 9, with reference to Table 2. Among the subframes having the subframe number 0, 1, 3, 4, 5, 6, 8, or 9, for PDSCH transmitted in the subframe number 0, 1, 4, 5, 6, or 9, PDSCH A/N can be transmitted in the uplink subframes 2, 3, 7, and 8 of the PCell. However, for PDSCH transmitted in the subframe number 3 or 8 of the SCell, PDSCH A/N cannot be transmitted in an uplink subframe of the PCell.

As described above, when a plurality of CCs use different TDD UL-DL configurations, a problem in that PDSCH A/N scheduling according to Table 2 cannot be used may occur.

Figure 6:
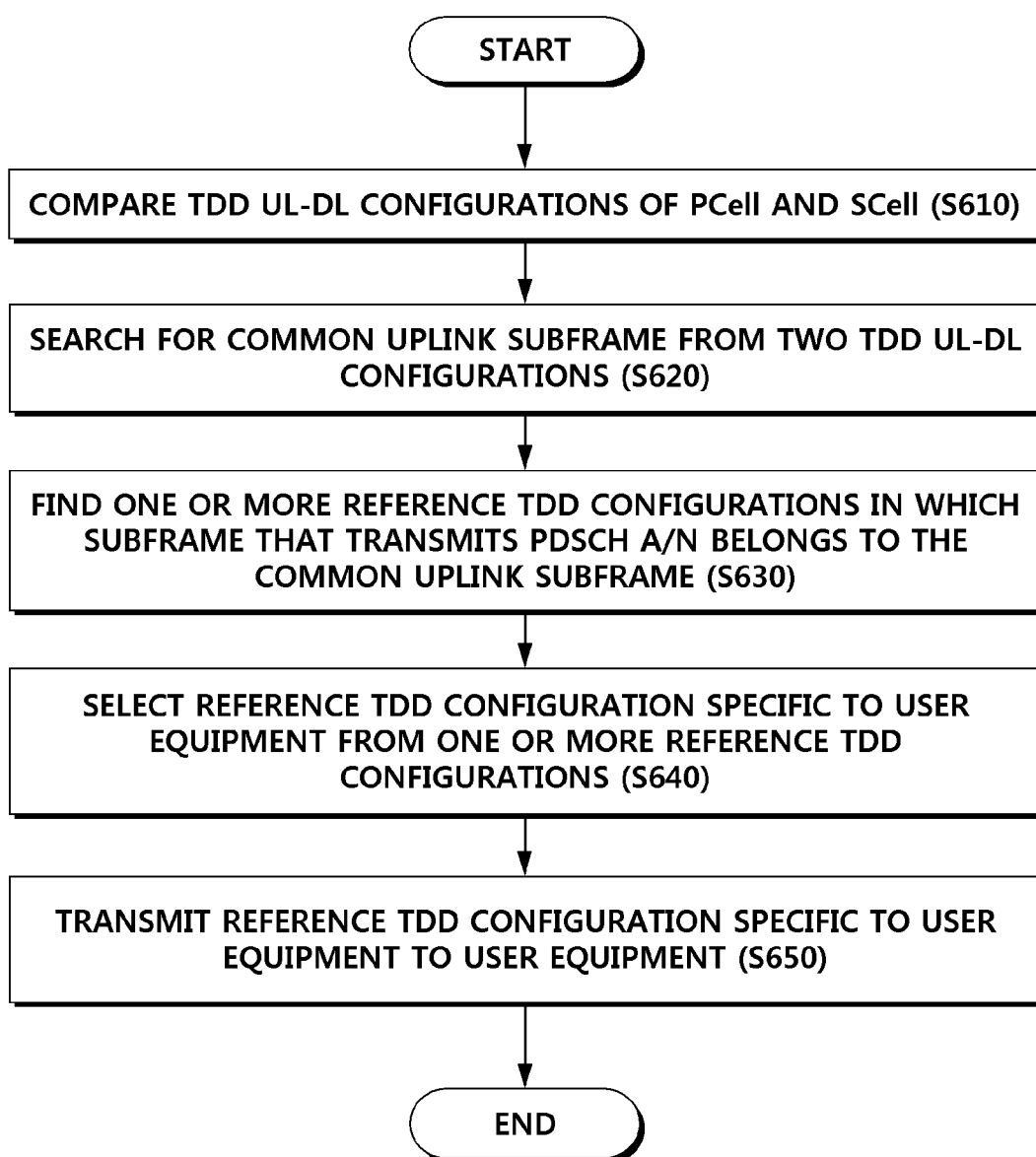
FIG. 6 is a flowchart illustrating a method of configuring PDSCH A/N timing of a transmission/reception point according to an exemplary embodiment of the present invention.

FIG. 6 is a flowchart illustrating a method of configuring PDSCH A/N timing of a transmission/reception point according to an exemplary embodiment of the present invention.

With reference to FIG. 6, the method of configuring PDSCH A/N timing of the transmission/reception point may include comparing two different TDD UL-DL configurations configured in a PCell and an SCell, respectively (S610), searching for one or more common uplink subframes from the two TDD UL-DL configurations (S620), identifying one or more reference TDD configurations that satisfy a condition that a set including uplink subframes of a reference TDD configuration for transmitting PDSCH A/N is a subset of a set including the one or more common uplink subframes determined in the operation S620 (S630), selecting a specific reference TDD configuration for a user equipment from the one or more reference TDD configurations (S640), and transmitting the specific reference TDD configuration to the user equipment (S650).

With reference to FIG. 6, the transmission/reception point compares two or more different TDD UL-DL configurations configured in a PCell and an SCell in operation S610. Hereinafter, an example of two different TDD UL-DL configurations will be described.

Next, the transmission/reception point searches for a common uplink subframe from the two TDD UL-DL configurations in operation S620. For example, when the TDD UL-DL configuration of the PCell is "0" and the TDD UL-DL configuration of the SCell is "1", an uplink subframe in the PCell has a subframe number 2, 3, 4, 7, 8, or 9, and an uplink subframe in the SCell has a subframe number 2, 3, 7, or 8. Therefore, the common uplink subframes are uplink subframes having subframe numbers 2, 3, 7, and 8.

Next, the transmission/reception point identifies one or more reference TDD configurations that satisfy a condition that a set including uplink subframes of a reference TDD configuration for transmitting PDSCH A/N is a subset of a set including the common uplink subframes from Table 2 in operation S630.

In the present disclosure, the reference TDD configuration is not for configuring uplink and downlink timing of a PCell or one or more SCells (See Table 1), but for configuring PDSCH A/N transmission timing of the PCell or the SCells (See Table 2). Based on the timing configured in this manner, PDSCH A/N information is transmitted through an uplink control channel on the PCell in the determined uplink subframe.

For example, it is assumed that the subframe numbers of the common uplink subframe are 2, 3, 7, and 8 as illustrated above. With reference to Table 2, when the TDD configuration is 1, PDSCH A/N can be transmitted in the subframe number 2, 3, 7, or 8; when the TDD configuration is 2, PDSCH A/N can be transmitted in the subframe number 2 or 7; when the TDD configuration is 4, PDSCH A/N can be transmitted in the subframe number 2 or 3; and when the TDD configuration is 5, PDSCH A/N can be transmitted in the subframe number 2. Therefore, the TDD configurations 1, 2, 4, and 5 can be reference TDD configurations because a set including uplink subframes of TDD configurations 1, 2, 4, or 5 is a subset of a set including the common uplink subframes 2, 3, 7, and 8.

However, when the TDD configuration is 0, PDSCH A/N can be transmitted in a subframe having the subframe number 2, 4, 7, or 9, and among the subframes 2, 4, 7, and 9, the subframe numbers 4 and 9 do not belong to the set including the common uplink subframes. When the TDD configuration is 3, PDSCH A/N can be transmitted in a subframe having the subframe number 2, 3, or 4, and among the subframes 2, 3, and 4, the subframe number 4 does not belong to the set including the common uplink subframes. When the TDD configuration is 6, PDSCH A/N can be transmitted in a subframe having the subframe number 2, 3, 4, 7, or 8, and among the subframes 2, 3, 4, 6, and 8, the subframe number 4 does not belong to the set including the common uplink subframes. Therefore, the TDD configurations 0, 3, and 6 are excluded from the reference TDD configuration.

Table 3 shows an example of reference TDD configurations ("reference PDSCH A/N timing") possible to all the TDD UL-DL configuration combinations of a PCell and an SCell. In Table 3, cases in that the TDD UL-DL configurations of the PCell and the SCell are the same are not described in the present disclosure.

TABLE 3

| Reference TDD configuration (Reference PDSCH A/N Timing) | | PCell TDD UL-DL configuration | | | | | | |
|---|---|---|---|---|---|---|---|---|
| | | 0 | 1 | 2 | 3 | 4 | 5 | 6 |
| SCell TDD UL-DL configuration | 0 | | 0 | 1, 2, 4, 5 | 2, 5 | 3, 4, 5 | 4, 5 | 5 | 1, 2, 3, 4, 5, 6 |
| | 1 | 1, 2, 4, 5 | | 1 | 2, 5 | 4, 5 | 4, 5 | 5 | 1, 2, 4, 5 |
| | 2 | 2, 5 | | 2, 5 | 2 | 5 | 5 | 5 | 2, 5 |
| | 3 | 3, 4, 5 | | 4, 5 | 5 | 3 | 4, 5 | 5 | 3, 4, 5 |
| | 4 | 4, 5 | | 4, 5 | 5 | 4, 5 | 4 | 5 | 4, 5 |
| | 5 | 5 | | 5 | 5 | 5 | 5 | 5 | 5 |
| | 6 | 1, 2, 3, 4, 5, 6 | 1, 2, 4, 5 | 2, 5 | 3, 4, 5 | 4, 5 | 5 | 6 |

The transmission/reception point can find one or more reference TDD configurations through the operations S610 to S630.

Further, the transmission/reception point may store information illustrated in e.g., Table 3, which is obtained by applying the operations S610 to S630 for all possible cases, in advance. In this case, the transmission/reception point finds one or more reference TDD configurations from Table 3 based on the TDD UL-DL configuration of a PCell and the TDD UL-DL configuration of an SCell instead of performing operations S610 to S630.

With reference to FIG. 6, the transmission/reception point may select a specific reference TDD configuration for a user equipment from one or more reference TDD configuration in operation S640.

For example, if a channel environment of the corresponding user equipment is not good (for example, when the user equipment is located on the border of cells, or an SNR (Signal to Noise Ratio) is low), it may be advantageous that the user equipment has as many PDSCH A/N timings as possible. This is because more credible A/N transmission is secured if more uplink subframes are provided such that PDSCH A/N timings are configured by reducing the amount of A/N information (Ack/Nack information) transmitted in one uplink subframe as much as possible, that is, by reducing the number of PDSCH A/Ns for PDSCHs transmitted in the downlink subframes to be transmitted in one uplink subframe as much as possible. Therefore, if the channel environment of the corresponding user equipment is not good, the transmission/reception point may select a reference TDD configuration having as many uplink subframes for PDSCH A/N timings as possible.

Meanwhile, if the channel environment of the corresponding user equipment is good (for example, when the user equipment is located in the center of a cell, or an SNR is high), it may be advantageous that the user equipment has as few PDSCH A/N timings as possible. More information may be transmitted with less electric power using a fewer number of uplink subframes if the channel environment is good. When the uplink PUCCH transmits PDSCH A/N and other information, e.g., UCI (Uplink Control Information), at the same time, PDSCH A/N, which is relatively more important, is transmitted and relatively less important information, such as CSI (Channel State Information), may not be transmitted. If there are few uplink subframes for transmitting PDSCH A/N in a reference TDD configuration, the possibility of dropping a transmission of relatively less important information, such as CSI, may be reduced. Therefore, if the channel environment of the corresponding user equipment is good, the transmission/reception point may select a reference TDD configuration that has as few uplink subframes for PDSCH A/N timings as possible.

For example, it is assumed that one or more reference TDD configurations are TDD configurations 1, 2, 4, and 5. When the reference TDD configuration is 1, the PDSCH A/N timings correspond to uplink subframe numbers 2, 3, 7, and 8 (the number of subframes for uplink is 4). When the reference TDD configuration is 2, the PDSCH A/N timings correspond to uplink subframe numbers 2 and 7 (the number of subframes for uplink is 2). When the reference TDD configuration is 4, the PDSCH A/N timings correspond to the uplink subframe numbers 2 and 3 (the number of the subframes for uplink is 2). When the reference TDD configuration is 5, the PDSCH A/N timings correspond to the uplink subframe number 2 (the number of subframes for uplink is 1). Therefore, when a channel environment is good, the reference TDD configuration may be selected as the reference TDD configuration 5; when a channel environment is bad, the reference TDD configuration may be selected as the reference TDD configuration 1; and when a channel environment is normal, the reference TDD configuration may be selected as the reference TDD configuration 2 or 4.

Further, the transmission/reception point may select a reference TDD configuration specific to a user equipment in consideration of simultaneous transmission and collision with other information or signals (for example, CSI) transmitted through uplink. For example, the transmission/reception point may configure PDSCH A/N transmission timing (and/or UCI transmission timing) so that a subframe in which PDSCH A/N is transmitted through PUCCH and a subframe in which CSI is transmitted through PUCCH are not overlapped with each other. Further, the transmission/reception point may configure PDSCH A/N transmission timings (and/or Sounding Reference Symbol (SRS) transmission timings) so that a subframe in which PDSCH A/N is transmitted through PUCCH and a subframe in which SRS is transmitted through PUCCH are not overlapped with each other.

Referring back to FIG. 6, the transmission/reception point may transmit the reference TDD configuration specific to the user equipment to the corresponding user equipment in operation S650. The reference TDD configuration specific to the user equipment can be transmitted to the user equipment through, e.g., RRC (Radio Resource Control) or PDCCH.

The information transmitted from the transmission/reception point to the user equipment can be a value of a reference TDD configuration. For example, when the TDD UL-DL configuration of the PCell is 1, the TDD UL-DL configuration of the SCell is 2, and the reference TDD configuration is 5, the transmission/reception point may transmit the reference TDD configuration 5.

Further, the information transmitted from the transmission/reception point to the user equipment may be an offset of the reference TDD configuration from the TDD UL-DL configuration of the PCell or the SCell. For example, when the TDD UL-DL configuration of the PCell is 1, the TDD UL-DL configuration of the SCell is 2, and the reference TDD configuration is 5, the transmission/reception point may transmit an offset 4, which is the offset of the reference TDD configuration from the TDD UL-DL configuration of the PCell.

Further, the information transmitted from the transmission/reception point to the user equipment may be an index of the reference TDD configuration specific to the user equipment among one or more possible reference TDD configurations. For example, when the TDD UL-DL configuration of the PCell is 1, and the TDD UL-DL configuration of the SCell is 2, the one or more possible reference TDD configurations are 2 and 5 with reference to Table 3. In this case, the index 1 may be assigned to the TDD configuration 2, and the index 2 may be assigned to the TDD configuration 5. When the reference TDD configuration specific to the user equipment is determined as 5, the transmission/reception point can transmit the index 2 that indicates the reference TDD configuration 5.

Figure 7:
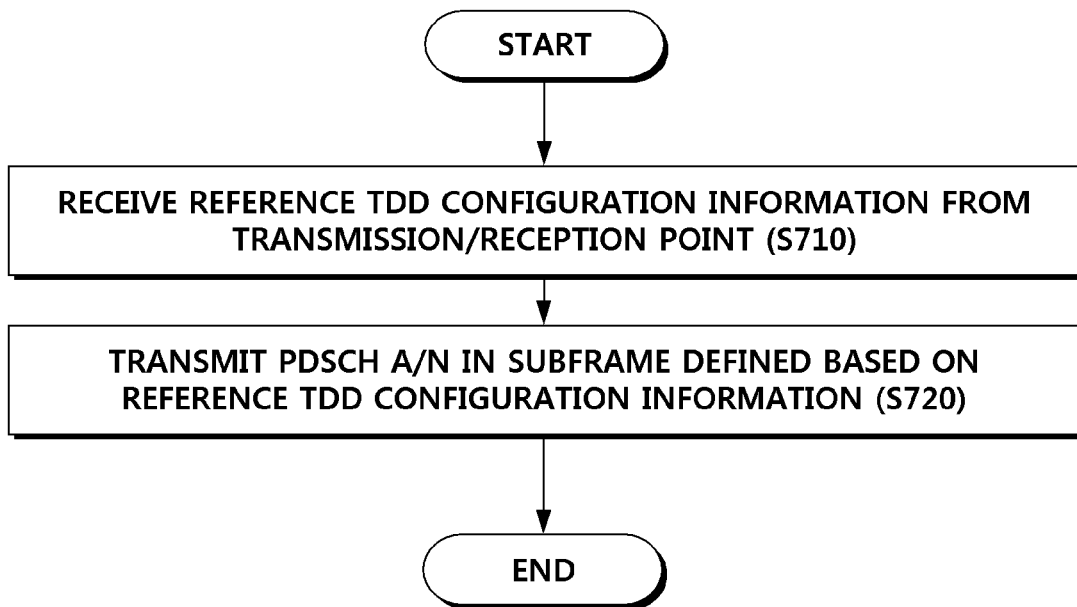
FIG. 7 is a diagram illustrating a PDSCH A/N transmitting method of a user equipment according to an exemplary embodiment of the present invention.

FIG. 7 is a diagram illustrating a PDSCH A/N transmitting method of a user equipment according to an exemplary embodiment of the present invention.

With reference to FIG. 7, the PDSCH A/N transmitting method of the user equipment may include receiving reference TDD configuration information from a transmission/reception point (S710), and transmitting PDSCH A/N in a subframe selected based on the reference TDD configuration information (S720).

The user equipment has configurations associated with a PCell and an SCell in a CA environment, and has information of the TDD UL-DL configurations of the PCell and the SCell through an upper layer signaling, such as system information (SI) and RRC.

The user equipment may receive the reference TDD configuration information from the transmission/reception point in operation S710. The reference TDD configuration information may be transmitted through RRC or PDCCH. The reference TDD configuration information may be the value of the reference TDD configuration, the offset of the reference TDD configuration from the UL-DL TDD configuration of the PCell or the SCell, or the index of the reference TDD configuration.

The user equipment may determine the uplink subframes (timings) of the PCell for transmitting PDSCH A/N based on the reference TDD configuration information and Table 2, determine specific PDSCH A/N for each of the determined uplink subframes in which the determined specific PDSCH A/N to be transmitted (the specific PDSCH A/N is A/N for PDSCH transmitted in a specific downlink subframe of the PCell and/or the SCell), and transmit the PDSCH A/N in the corresponding uplink subframe in operation S720.

More specifically, the user equipment may determine an uplink subframe of a PCell for transmitting PDSCH A/N based on the reference TDD configuration information and Table 2. Using the downlink association set index(es) (K) of Table 2, specific PDSCH A/N to be transmitted in each of the determined uplink subframes may be determined (the specific PDSCH A/N is A/N for PDSCH transmitted in a specific downlink subframe). For example, if the index of the determined uplink subframe for PDSCH A/N transmission is 'n', the PDSCH A/N for PDSCH transmitted in the (n−k) (k e K) subframe may be transmitted in the uplink subframe 'n'. If the (n−k) subframe is not a subframe (downlink subframe (D) or a special subframe (S)) that performs downlink transmission (when the user equipment is in a half-duplex mode or a full-duplex mode), or if the (n−k) subframe is muted (when the user equipment is in the half-duplex mode), PDSCH is not transmitted in the subframe, and therefore PDSCH A/N for PDSCH corresponding to the (n−k) subframe may not be transmitted regardless of the configuration of Table 2.

For example, it is assumed that the TDD UL-DL configuration of the PCell is 0, and the TDD UL-DL configuration of the SCell is 1. In this case, the UL-DL configuration of the PCell is 'DSUUUDSUUU', and the UL-DL configuration of the SCell is 'DSUUDDSUUD', and the subframes 4 and 9 are conflicting subframes. With reference to Table 3, in this case, the reference TDD configuration may be one of 1, 2, 4, and 5.

Figure 8:
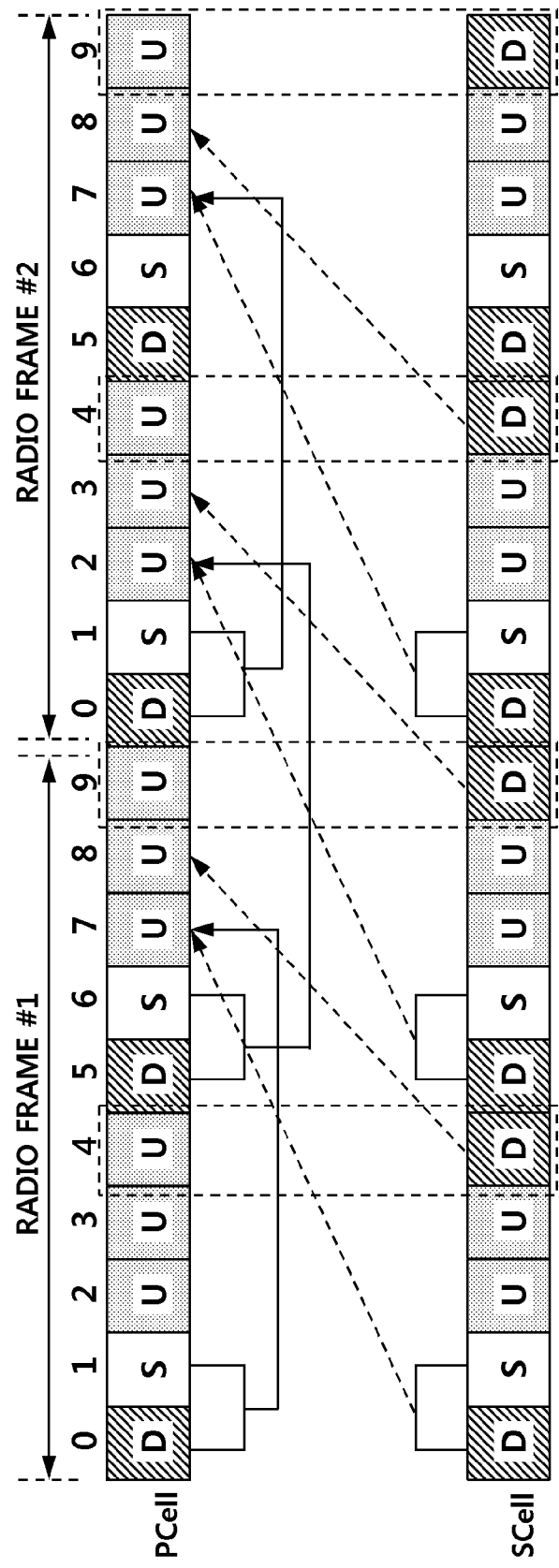
FIG. 8, FIG. 9, FIG. 10, and FIG. 11 are diagrams illustrating examples of a relation between a subframe transmitting PDSCH and a subframe transmitting PDSCH A/N at a PDSCH A/N timing according to an exemplary embodiment of the present invention.

FIG. 8 is a diagram illustrating an example in that the TDD UL-DL configuration of the PCell is 0, the TDD UL-DL configuration of the SCell is 1, and the reference TDD configuration is 1. When the reference TDD configuration is 1, with reference to Table 2, when n=2, K={7, 6}, when n=3, K={4}, when n=7, K={7, 6}, and when n=8, K={4}.

In the subframe 2 of the PCell in each radio frame, A/N for PDSCH may be transmitted with respect to the PDSCH transmissions in the subframes 5 and 6 of the PCell in the previous radio frame and the PDSCH transmissions in the subframes 5 and 6 of the SCell in the previous radio frame.

Further, in the subframe 3 of the PCell in each radio frame, A/N for PDSCH may be transmitted with respect to the PDSCH transmissions in the subframe 9 of the SCell in the previous radio frame. Since subframe 9 of the PCell is an uplink subframe, the PDSCH A/N for PDSCH corresponding to the subframe 9 of the PCell is not transmitted in the subframe 3 of the PCell in the next radio frame. If the user equipment is in a half-duplex mode and the subframe 9 of the SCell is muted, PDSCH A/N for PDSCH corresponding to the subframe 9 of the SCell may not be transmitted because of the muted state of the subframe 9 of the SCell.

In the subframe 7 of the PCell in each radio frame, PDSCH A/N may be transmitted with respect to the PDSCH transmissions in the subframes 0 and 1 of the PCell and the PDSCH transmissions in the SCell in the same radio frame.

In the subframe 8 of the PCell in each radio frame, PDSCH A/N may be transmitted with respect to the PDSCH transmission in the subframe 4 of the SCell in the same radio frame. Since the subframe 4 of the PCell is an uplink subframe, PDSCH A/N for PDSCH corresponding to the subframe 4 of the PCell is not transmitted in the subframe 8 of the PCell in the same radio frame. If the user equipment is in a half-duplex mode and the subframe 4 of the SCell is muted, PDSCH A/N for PDSCH corresponding to the subframe 4 of the SCell may not be transmitted because of the muted state of the subframe 4 of the SCell.

Figure 9:
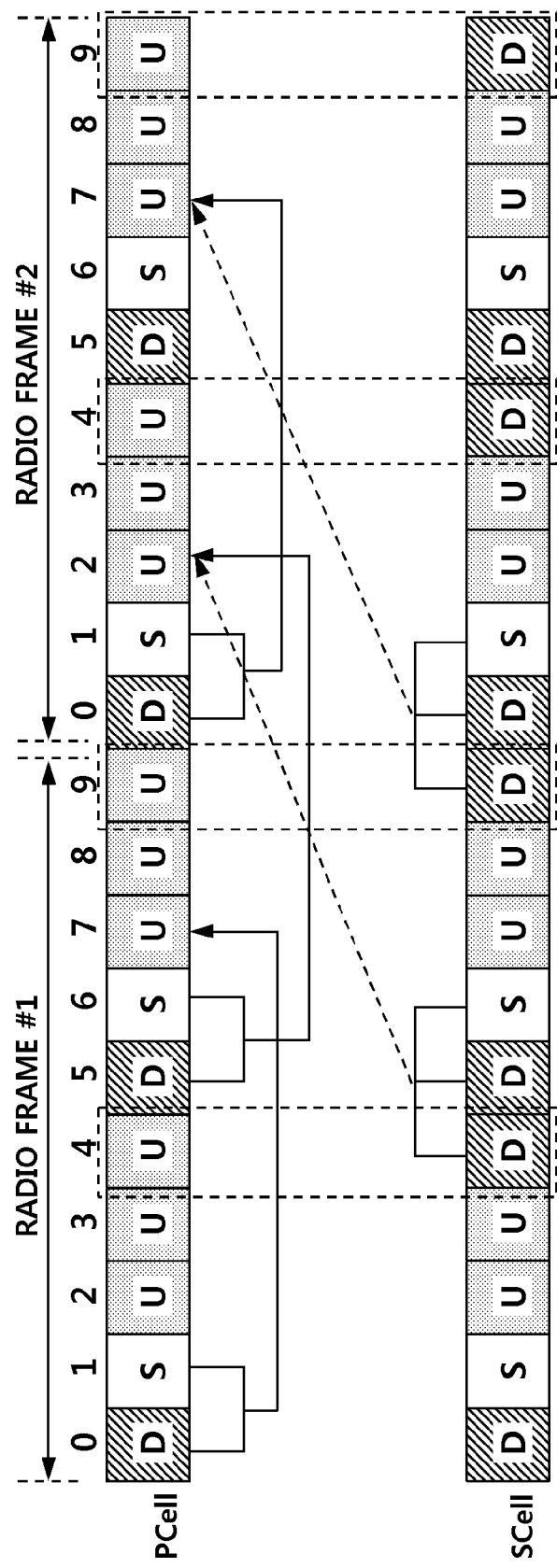

FIG. 9 is a diagram illustrating an example in which the TDD UL-DL configuration of the PCell is 0, the TDD UL-DL configuration of the SCell is 1, and the reference TDD configuration is 2. If the reference TDD configuration is 2, when n=2, K={8, 7, 4, 6}; and when n=7, K={8, 7, 4, 6}, with reference to Table 2.

In the subframe 2 of the PCell in each radio frame, PDSCH A/N may be transmitted with respect to the PDSCH transmissions in the subframes 5 and 6 of the PCell in the previous radio frame. Since the subframes 4 and 8 of the PCell in the previous radio frame are uplink subframes, PDSCH A/N for PDSCH corresponding to the subframes 4 or 8 of the PCell may not be transmitted. Further, in the subframe 2 of the PCell in each radio frame, PDSCH A/N may be transmitted with respect to the PDSCH transmissions in the subframes 4, 5, and 6 of the SCell in the previous radio frame. Since the subframe 8 of the SCell is an uplink subframe, PDSCH A/N for PDSCH corresponding to the subframe 8 of the SCell is not transmitted. If the user equipment is in a half-duplex mode and the subframe 4 of the SCell is muted, PDSCH A/N for PDSCH corresponding to the subframe 4 of the SCell may not be transmitted because of the muted state of the subframe 4 of the SCell.

In the subframe 7 of the PCell in each radio frame, PDSCH A/N may be transmitted with respect to the PDSCH transmissions in the subframes 0 and 1 of the PCell in the same radio frame. Since the subframe 9 of the PCell in the previous radio frame and the subframe 3 of the PCell in the same radio frame are uplink subframes, PDSCH A/N for PDSCH corresponding to the subframes 9 and 3 of the PCell are not transmitted. Further, PDSCH A/N with respect to the PDSCH transmissions in the subframes 9 (in the previous radio frame), 0, and 1 of the SCell may be transmitted in the subframe 7 of the PCell. Since the subframe 3 of the SCell is an uplink subframe, PDSCH A/N for PDSCH corresponding to the subframe 3 of the SCell is not transmitted. If the user equipment is in a half-duplex mode and the subframe 9 of the SCell is muted, PDSCH A/N for PDSCH corresponding to the subframe 9 of the SCell may not be transmitted because of the muted state of the subframe 9 of the SCell.

Figure 10:
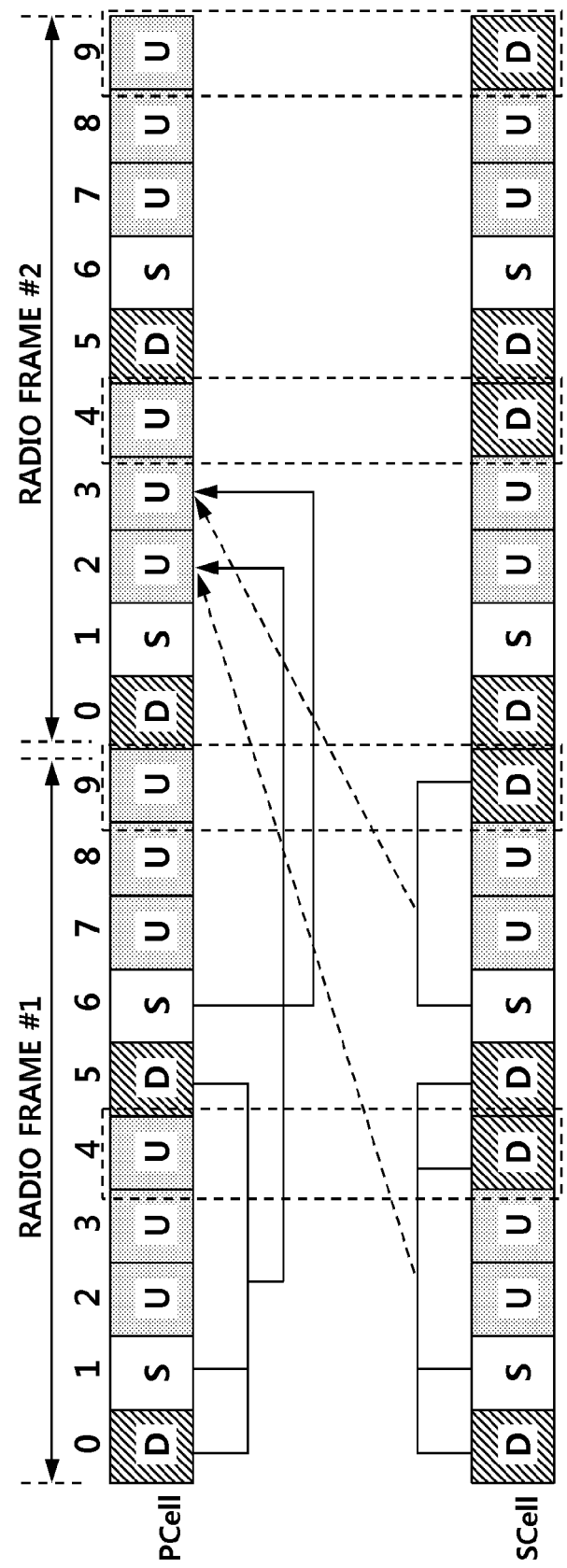

FIG. 10 is a diagram illustrating an example in which the TDD UL-DL configuration of the PCell is 0, the TDD UL-DL configuration of the SCell is 1, and the reference TDD configuration is 4. If the reference TDD configuration is 4, when n=2, K={12, 8, 7, 11}; and when n=3, K={6, 5, 4, 7}, with reference to Table 2.

In the subframe 2 of the PCell in each radio frame, PDSCH A/N may be transmitted with respect to the PDSCH transmissions in the subframes 0, 1, and 5 of the PCell in the previous radio frame. Since the subframe 4 of the PCell in the previous radio frame is an uplink subframe, PDSCH A/N for PDSCH corresponding to the subframe 4 of the PCell is not transmitted. Further, in the subframe 2 of the PCell in each radio frame, PDSCH A/N may be transmitted with respect to the PDSCH transmissions in the subframes 0, 1, 4, and 5 of the SCell in the previous subframe. If the user equipment is in a half-duplex mode and the subframe 4 of the SCell is muted, PDSCH A/N for PDSCH corresponding to the subframe 4 of the SCell may not be transmitted because of the muted state of the subframe 4 of the SCell.

In the subframe 3 of the PCell in each radio frame, PDSCH A/N may be transmitted with respect to the subframe 6 of the PCell in the previous radio frame. Since the subframes 7, 8, and 9 of the PCell in the previous radio frame are uplink subframes, PDSCH A/N for PDSCH corresponding to the subframes 7, 8, or 9 of the PCell is not transmitted. Further, in the subframe 3 of the PCell, PDSCH A/N may be transmitted with respect to the subframes 6 and 9 of the SCell in the previous radio frame. Since the subframes 7 and 8 of the SCell in the previous radio frame are uplink subframes, PDSCH A/N for PDSCH corresponding to the subframe 7 or 8 of the SCell is not transmitted. If the user equipment is in a half-duplex mode and the subframe 9 of the SCell is muted, PDSCH A/N for PDSCH corresponding to the subframe 9 of the SCell may not be transmitted because of the muted state of the subframe 9 of the SCell.

Figure 11:
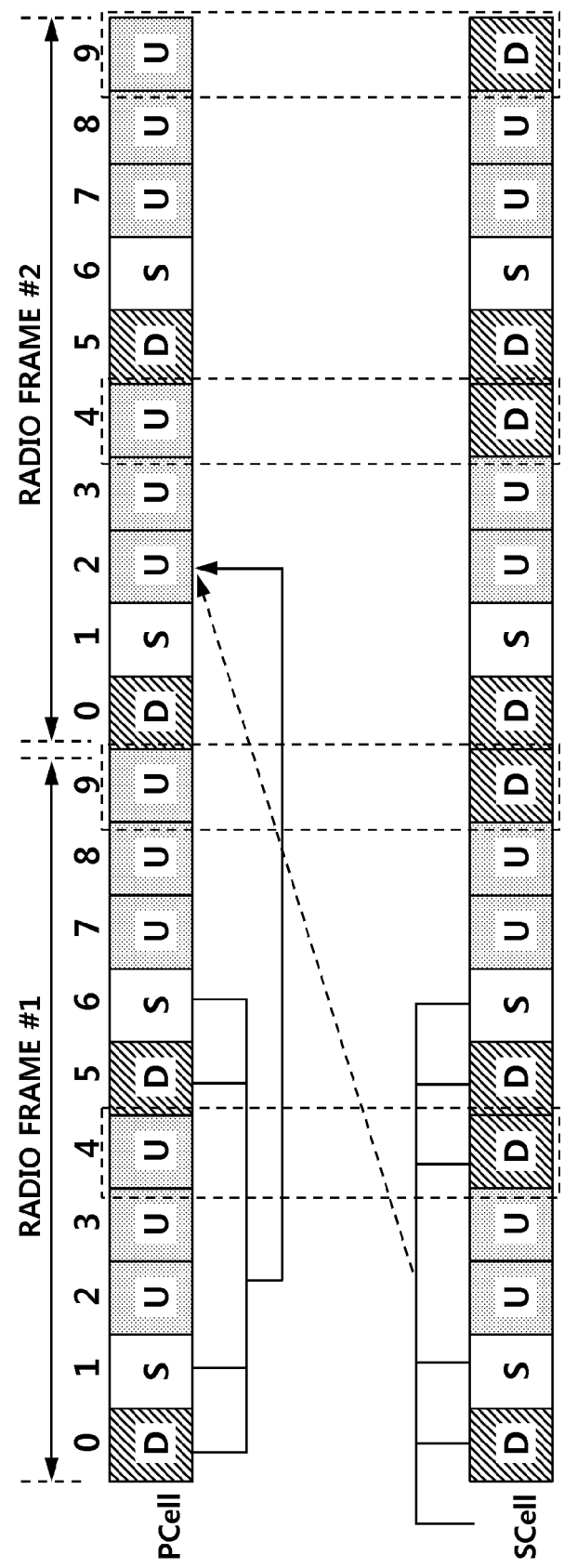

FIG. 11 is a diagram illustrating an example in which the TDD UL-DL configuration of the PCell is 0, the TDD UL-DL configuration of the SCell is 1, and the reference TDD configuration is 5. If the reference TDD configuration is 5, when n=2, K={13, 12, 9, 8, 7, 5, 4, 11, 6} with reference to Table 2.

In the subframe 2 of the PCell in each radio frame, PDSCH A/N may be transmitted with respect to the PDSCH transmissions in the subframes 0, 1, 5, and 6 of the PCell in the previous radio frame. Since the subframes 3, 4, 7, and 8 of the PCell in the previous radio frame and the subframe 9 of the PCell in the radio frame immediately before the previous radio frame are uplink subframes, PDSCH A/N for PDSCH corresponding to the subframes 9, 3, 4, 7, or 8 of the PCell is not transmitted. Further, in the subframe 2 of the PCell in each radio frame, PDSCH A/N may be transmitted with respect to the PDSCH transmissions in the subframe 0, 1, 4, 5, and 6 of the SCell in the previous radio frame and the subframe 9 of the SCell in the radio frame immediately before the previous radio frame. Since the subframes 3, 7, and 8 of the SCell in the previous radio frame are uplink subframes, PDSCH A/N for PDSCH corresponding to the subframes 3, 7, or 8 of the SCell is not transmitted. If the user equipment is in a half-duplex mode, and the subframes 4 and 9 of the SCell are muted, PDSCH A/N for PDSCH corresponding to the subframes 4 or 9 of the SCell may not be transmitted because of the muted state of the subframes 4 and 9 of the SCell.

Further, according to aspects of the present invention, HARQ timings can be independently applied to respective PCell and SCell.

Figure 12:
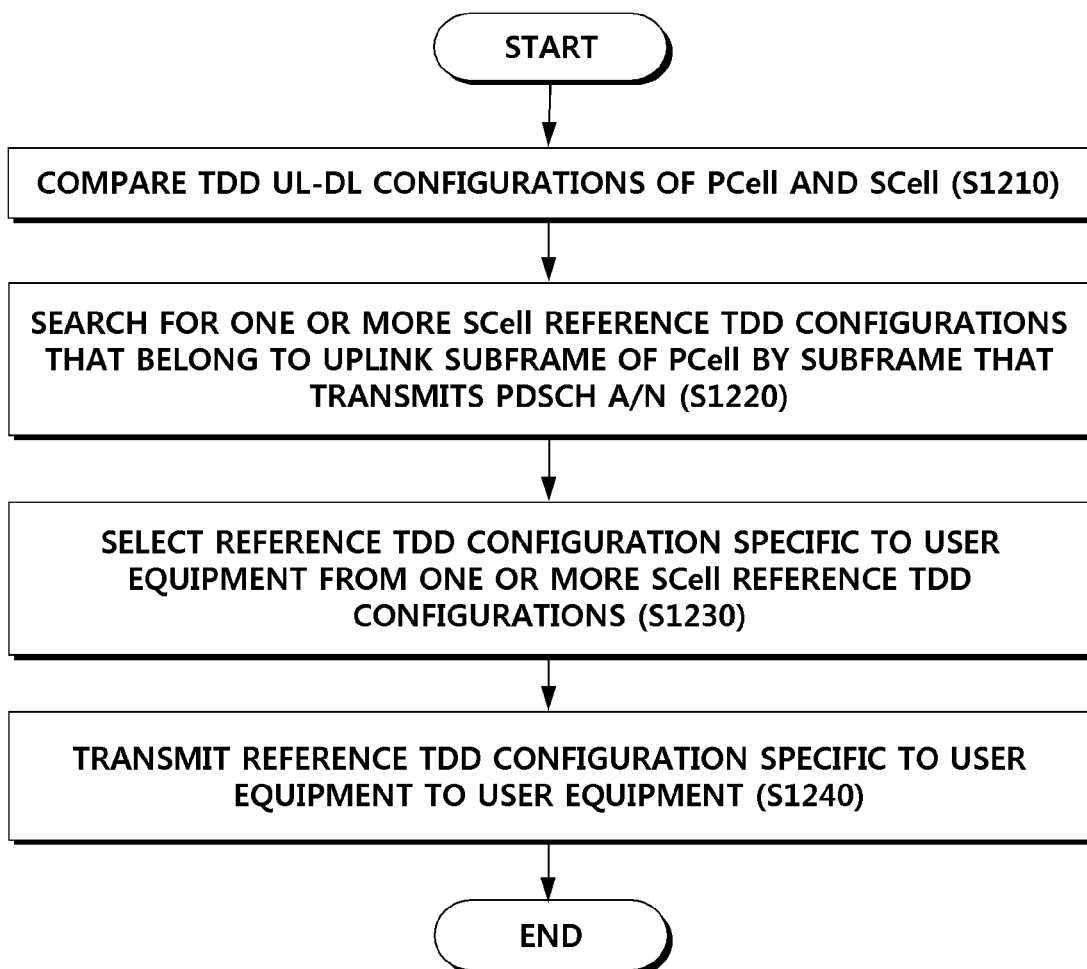
FIG. 12 is a flowchart illustrating a method of configuring PDSCH A/N timing of a transmission/reception point according to an exemplary embodiment of the present invention.

FIG. 12 is a flowchart illustrating a method of configuring PDSCH A/N timing of a transmission/reception point according to an exemplary embodiment of the present invention.

With reference to FIG. 12, a method of configuring PDSCH A/N timings of the transmission/reception point includes comparing the TDD UL-DL configurations of a PCell and one or more SCells (S1210), searching for one or more SCell reference TDD configurations that satisfy a condition that a set including uplink subframes of an SCell reference TDD configuration for PDSCH A/N transmission is a subset of a set including uplink subframes of the PCell (S1220), selecting an SCell reference TDD configuration specific to a user equipment from the SCell reference TDD configurations (S1230), and transmitting the SCell reference TDD configuration specific to the user equipment to the user equipment (S1240).

With reference to FIG. 12, the transmission/reception point compares two or more different TDD UL-DL configurations configured in a PCell and one or more SCells in operation S1210. Hereinafter, a description will be made with reference to a case in which the TDD UL-DL configurations are different between one PCell and one SCell, for example, but aspects of the present invention are not limited thereto.

Next, the transmission/reception point identifies one or more SCell reference TDD configurations that satisfy a condition that a set including uplink subframes of an SCell reference TDD configuration for PDSCH A/N transmission is a subset of a set including uplink subframes of the PCell in operation S1220.

For example, if the TDD UL-DL configuration of the PCell is "1" and the TDD UL-DL configuration of the SCell is "2", the uplink subframe in the PCell has the subframe numbers 2, 3, 7, and 8. With reference to Table 2, if TDD UL-DL configuration is "1", the PDSCH A/N can be transmitted in the subframe number 2, 3, 7, or 8; if the TDD UL-DL configuration is "2", PDSCH A/N can be transmitted in the subframe number 2 or 7; if the TDD UL-DL configuration is "4", PDSCH A/N can be transmitted in the subframe number 2 or 3; and if the TDD UL-DL configuration is "5", PDSCH A/N can be transmitted in the subframe number 2. Therefore, the TDD UL-DL configurations 1, 2, 4, and 5 can be SCell reference TDD configurations.

In another example, if the TDD UL-DL configuration of the PCell is "2", and the TDD UL-DL configuration of the SCell is "1", the uplink subframe in the PCell has a subframe number 2 or 7. With reference to Table 2, if the TDD UL-DL configuration is "2", PDSCH A/N can be transmitted in the subframe number 2 or 7; and if the TDD UL-DL configuration is "5", PDSCH A/N can be transmitted in the subframe number 2. Therefore, the TDD UL-DL configurations 2 and 5 can be SCell reference TDD configurations.

The transmission/reception point selects an SCell reference TDD configuration specific to a user equipment from one or more SCell reference TDD configurations in operation S1230.

If one or more SCell reference TDD configurations identified in the operation S1220 include the TDD UL-DL configuration of the SCell, the SCell reference TDD configuration specific to a user equipment may be the TDD UL-DL configuration of the SCell. For example, if the TDD UL-DL configuration of the PCell is "1", and the TDD UL-DL configuration of the SCell is "2", the SCell reference TDD configuration may be a TDD UL-DL configuration 1, 2, 4, or 5, and the SCell reference TDD configuration specific to the user equipment can be 2, which is the TDD UL-DL configuration of the SCell. In general, if the uplink subframes of the PCell include all of the PDSCH A/N transmission subframes of the SCell, the SCell reference TDD configuration specific to the user equipment can be the TDD UL-DL configuration of the SCell.

If one or more SCell reference TDD configurations identified in the operation S1220 do not include the TDD UL-DL configuration of the SCell, the transmission/reception point may select the SCell reference TDD configuration specific to the user equipment according to a certain policy. For example, if the channel environment of the corresponding user equipment is not good, the transmission/reception point may select an SCell reference TDD configuration having as many uplink subframes for PDSCH A/N timings as possible. If the channel environment of the corresponding user equipment is good, the transmission/reception point may select an SCell reference TDD configuration having as few uplink subframes for PDSCH A/N timings as possible. If the TDD UL-DL configuration of the PCell is "2" and the TDD UL-DL configuration of the SCell is "1", the SCell reference TDD configuration may be a TDD UL-DL configuration 2 or 5, and the transmission/reception point may select one from the TDD UL-DL configurations 2 and 5.

Further, the transmission/reception point transmits the SCell reference TDD configuration specific to the user equipment to the user equipment in operation S1240.

The information transmitted from the transmission/reception point to the user equipment can be a value of an SCell reference TDD configuration. Further, the information transmitted from the transmission/reception point to the user equipment can be an offset of the SCell reference TDD configuration from the TDD UL-DL configuration of the PCell or the SCell. Further, the information transmitted from the transmission/reception point to the user equipment can be the index of the SCell reference TDD configuration specific to the user equipment among one or more possible SCell reference TDD configurations.

Figure 13:
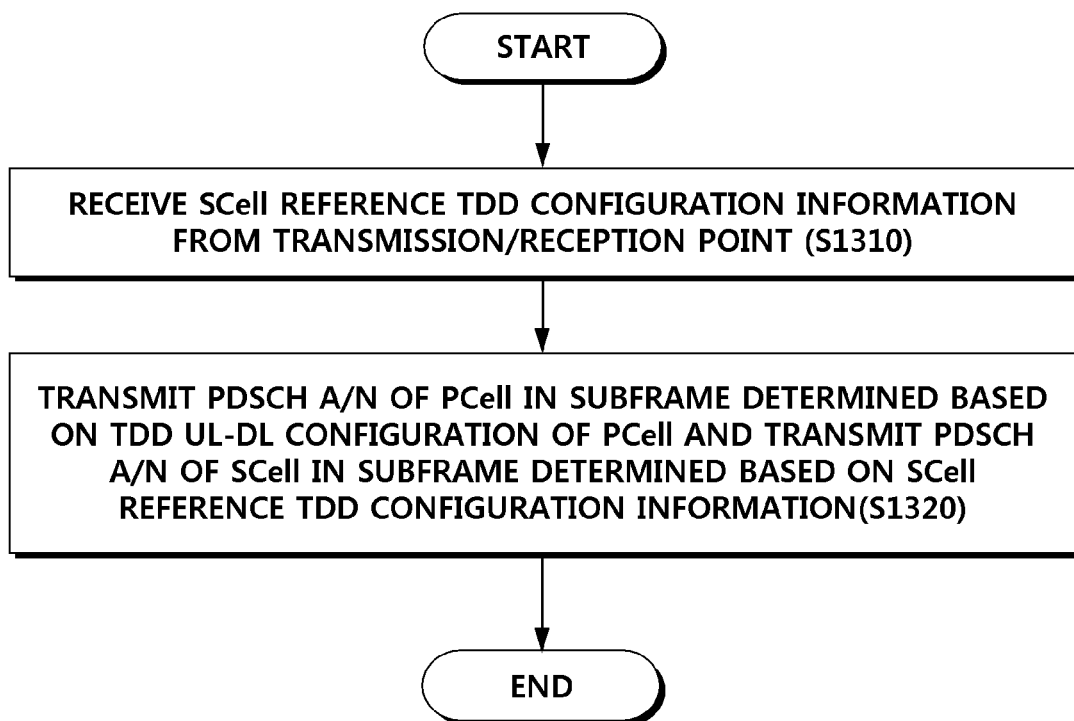
FIG. 13 is a diagram illustrating a method of transmitting PDSCH A/N of a user equipment according to an exemplary embodiment of the present invention.

FIG. 13 is a diagram illustrating a method of transmitting PDSCH A/N of a user equipment according to an exemplary embodiment of the present invention.

With reference to FIG. 13, the method of transmitting PDSCH A/N of a user equipment includes receiving SCell reference TDD configuration information from a transmission/reception point (S1310), and transmitting PDSCH A/N in a subframe determined according to a TDD UL-DL configuration of a PCell in case of the PCell and/or transmitting PDSCH A/N in a subframe determined according to an SCell reference TDD configuration of an SCell in case of the SCell (S1320).

The user equipment has configurations associated with a PCell and an SCell in a CA environment, and has information of the TDD UL-DL configurations of the PCell and the SCell through an upper layer signaling, such as system information (SI) and RRC.

The user equipment receives the SCell reference TDD configuration information from the transmission/reception point in operation S1310. The SCell reference TDD configuration information is transmitted through RRC or PDCCH.

In case of the PCell, the user equipment determines an uplink subframe (timing) of the PCell for transmitting PDSCH A/N based on the TDD UL-DL configuration of the PCell and Table 2, and transmits PDSCH A/N of the PCell in the determined uplink subframe. In case of the SCell, the user equipment determines an uplink subframe (timing) of the PCell for transmitting PDSCH A/N based on the SCell reference TDD UL-DL configuration and Table 2, and transmits PDSCH A/N of the SCell in the determined uplink subframe in operation S1320.

For example, it is assumed that the TDD UL-DL configuration of the PCell is 0 and the TDD UL-DL configuration of the SCell is 1. In such a case, the UL-DL configuration of the PCell is 'DSUUUDSUUU', the UL-DL configuration of the SCell is 'DSUUDDSUUD', and the subframe 4 and 9 are conflicting subframes. In such a case, the SCell reference TDD configuration is one of TDD UL-DL configurations 0, 1, 2, 3, 4, 5, and 6. In an example, the SCell reference TDD configuration can be 1, which is the same as the TDD UL-DL configuration of the SCell.

Figure 14:
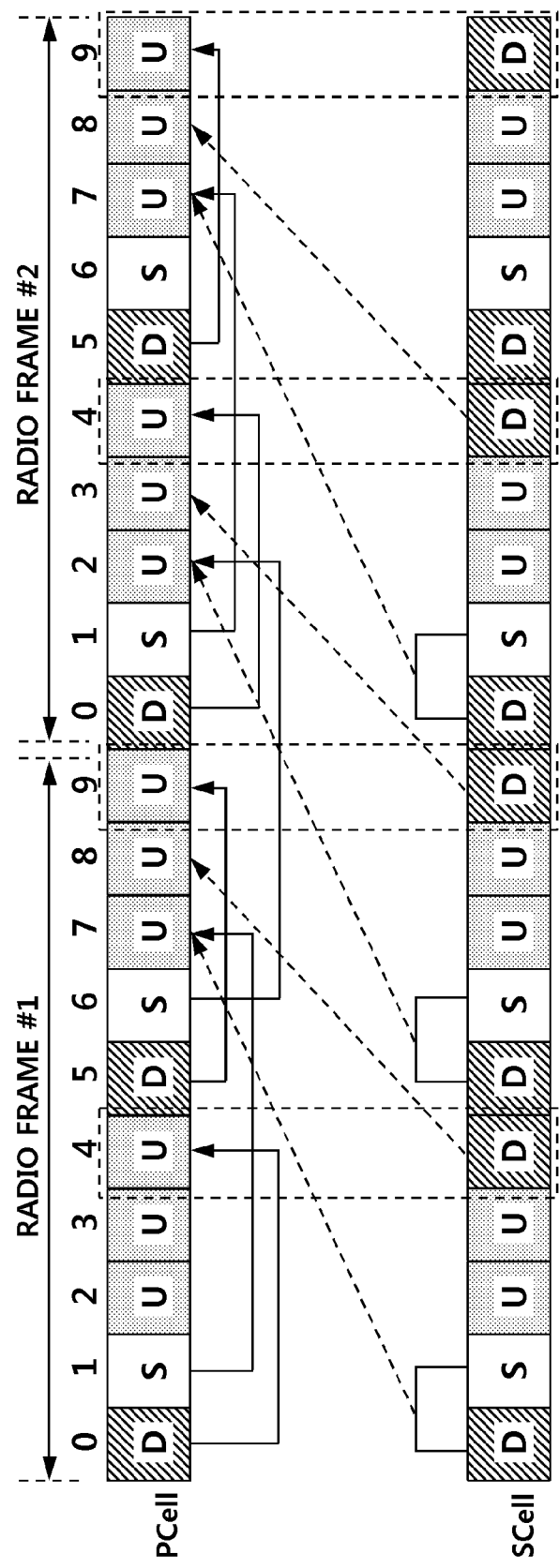
FIG. 14 and FIG. 15 are diagrams illustrating examples of a relation between a subframe transmitting PDSCH and a subframe transmitting PDSCH A/N at a PDSCH A/N timing according to an exemplary embodiment of the present invention.

FIG. 14 is a diagram illustrating a case in which the TDD UL-DL configuration of the PCell is 0, the TDD UL-DL configuration of the SCell is 1, and the SCell reference TDD configuration is 1.

Since the PCell follows the TDD UL-DL configuration of the PCell, PDSCH A/N for PDSCH transmitted in the subframe 6 of the PCell in each radio frame can be transmitted in the subframe 2 of the PCell in the next radio frame; PDSCH A/N for PDSCH transmitted in the subframe 0 of the PCell in each radio frame can be transmitted in the subframe 4 of the PCell in the same radio frame; PDSCH A/N for PDSCH transmitted in the subframe 1 of the PCell in each radio frame can be transmitted in the subframe 7 of the PCell in the same radio frame; and PDSCH A/N for PDSCH transmitted in the subframe 5 of the PCell in each radio frame can be transmitted in the subframe 9 of the PCell in the same radio frame.

Since the SCell follows the SCell reference TDD configuration, PDSCH A/N for PDSCH transmitted in the subframes 5 and 6 of the SCell in each radio frame can be transmitted in the subframe 2 of the PCell in the next radio frame; PDSCH A/N for PDSCH transmitted in the subframe 9 of the SCell in each radio frame can be transmitted in the subframe 3 of the PCell in the next radio frame; PDSCH A/N for PDSCH transmitted in the subframes 0 or 1 of the SCell in each radio frame can be transmitted in the subframe 7 of the PCell in the same radio frame; and PDSCH A/N for PDSCH transmitted in the subframes 4 of the SCell in each radio frame can be transmitted in the subframe 8 of the PCell in the same radio frame.

In another example, it is assumed that the TDD UL-DL configuration of the PCell is 1, and the TDD UL-DL configuration of the SCell is 0. In such a case, the UL-DL configuration of the PCell is 'DSUUDDSUUD', and the UL-DL configuration of the SCell is 'DSUUUDSUUU', and the subframes 4 and 9 are conflicting subframes. In such a case, the SCell reference TDD configuration may be one of TDD UL-DL configurations 1, 2, 4, and 5.

Figure 15:
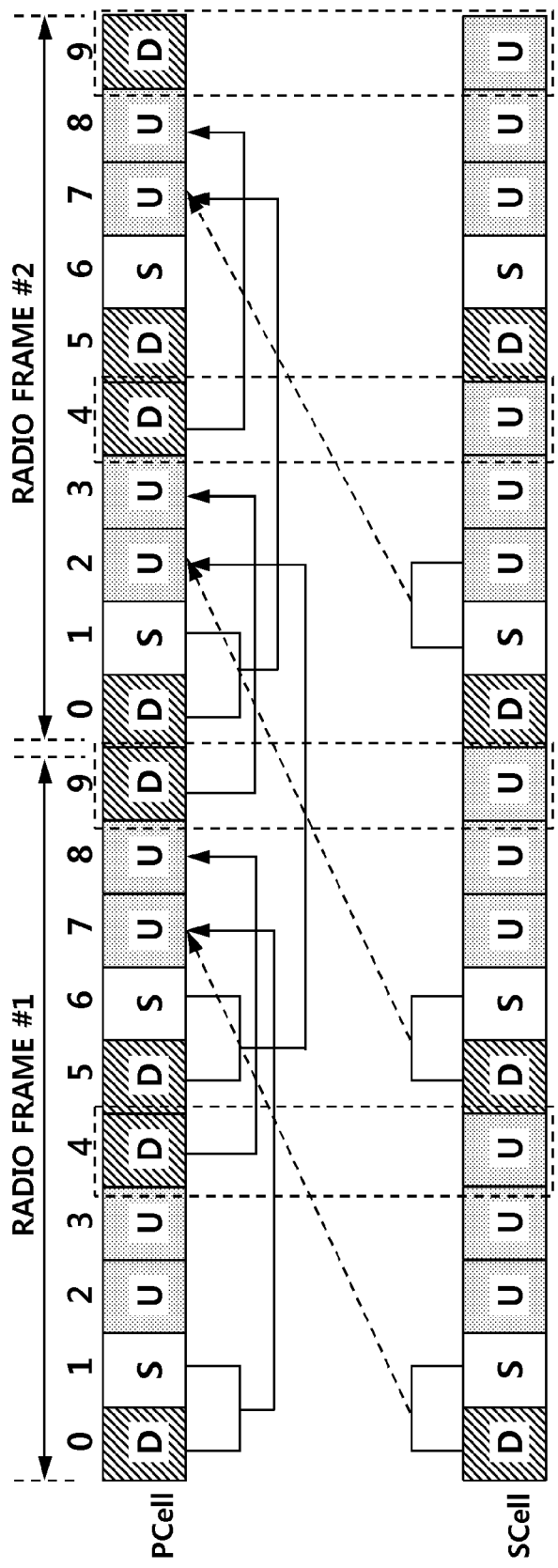

FIG. 15 is a diagram illustrating a case in which the TDD UL-DL configuration of the PCell is 1, the TDD UL-DL configuration of the SCell is 0, and the SCell reference TDD configuration is 2.

Since the PCell follows the TDD UL-DL configuration of the PCell, in the PCell, PDSCH A/N for PDSCH transmitted in the subframes 5 and 6 of the PCell in each radio frame can be transmitted in the subframe 2 of the PCell in the next radio frame; PDSCH A/N for PDSCH transmitted in the subframe 9 of the PCell in each radio frame can be transmitted in the subframe 3 of the PCell in the next radio frame; PDSCH A/N for PDSCH transmitted in the subframe 0 or 1 of the PCell in each radio frame can be transmitted in the subframe 7 of the PCell in the same radio frame; and PDSCH A/N for PDSCH transmitted in the subframe 4 of the PCell in each radio frame can be transmitted in the subframe 8 of the PCell in the same radio frame.

The SCell follows the SCell reference TDD configuration of the SCell. In the PCell, PDSCH A/N for PDSCH transmitted in the subframes 5 and 6 of the SCell in each radio frame can be transmitted in the subframe 2 of the PCell in the next radio frame. Since the subframes 4 and 8 of the SCell are uplink subframes, PDSCH A/N for PDSCH corresponding to the subframes 4 or 8 of the SCell is not transmitted. PDSCH A/N for PDSCH transmitted in the subframes 0 and 1 of the SCell in each radio frame can be transmitted in the subframe 7 of the PCell in the same radio frame. Since the subframes 9 and 3 of the SCell are uplink subframes, PDSCH A/N for PDSCH corresponding to the subframes 9 and 3 of the SCell is not transmitted.

Figure 16:
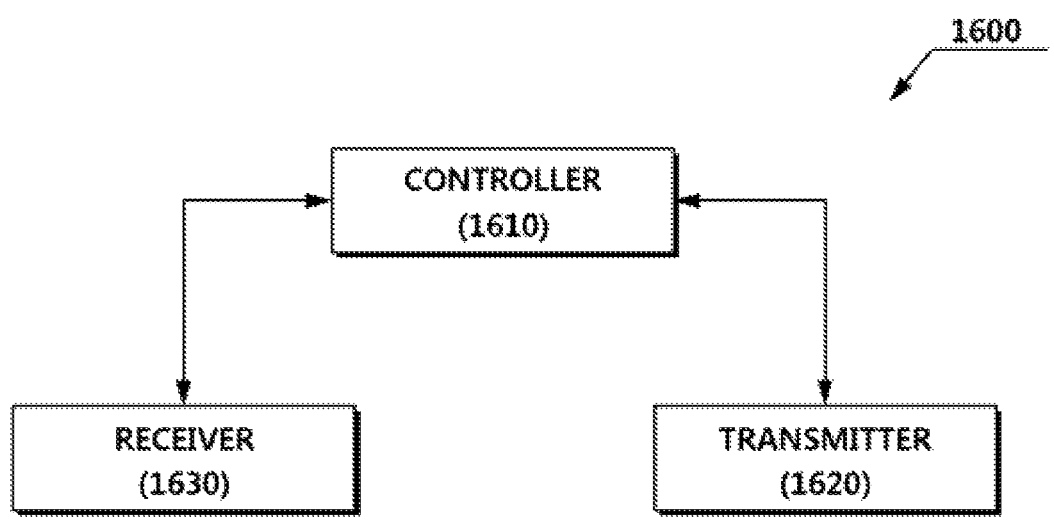
FIG. 16 is a diagram illustrating a configuration of a transmission/reception point according to an exemplary embodiment of the present invention.

FIG. 16 is a diagram illustrating a configuration of a transmission/reception point according to an exemplary embodiment of the present invention.

With reference to FIG. 16, a transmission/reception point 1600 includes a controller 1610, a transmitter 1620, and a receiver 1630.

The controller 1610 selects a reference TDD configuration specific to a user equipment or an SCell reference TDD configuration. The user equipment and the transmission/reception point uses a CA technology that performs a communication using a plurality of CCs associated with the PCell and the SCell, and the controller 1610 selects the reference TDD configuration or the SCell reference TDD configuration for determining timings in which the user equipment transmits PDSCH A/N through the PCell if the TDD UL-DL configuration of the PCell and the TDD UL-DL configuration of the SCell are different from each other.

The controller 1610 identifies one or more reference TDD configurations by using the TDD UL-DL configuration of the PCell, the TDD UL-DL configuration of the SCell, and Table 3. Further, with reference to FIG. 6, it is possible to identify one or more reference TDD configurations through the operations S610 to S630 as described above. Further, the controller 1610 identifies one or more SCell reference TDD configurations based on the TDD UL-DL configuration of the PCell.

The controller 1610 may select the reference TDD configuration specific to the user equipment or the SCell reference TDD configuration from one or more reference TDD configurations or SCell reference TDD configurations in consideration of the channel environment of the user equipment, the geographical location, or uplink transmission timing of other information and signals.

The transmitter 1620 may transmit the reference TDD configuration specific to the user equipment selected by the controller 1610 or information on the SCell reference TDD configuration to the user equipment. The transmission to the user equipment can be performed through RRC or PDCCH.

The receiver 1630 can receive uplink control information (UCI) that includes PDSCH A/N from the user equipment.

Figure 17:
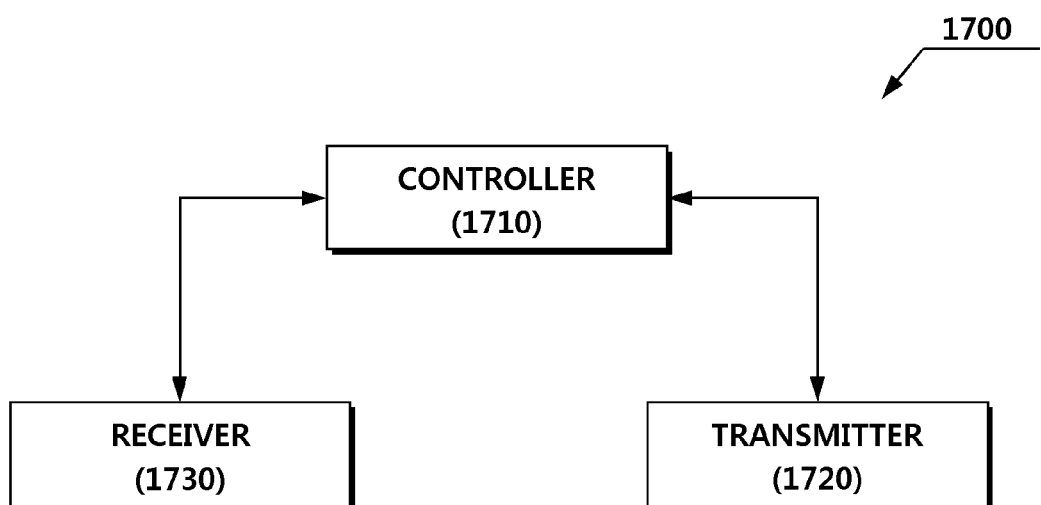
FIG. 17 is a diagram illustrating a configuration of a user equipment according to an exemplary embodiment of the present invention.

FIG. 17 is a block diagram illustrating a configuration of a user equipment according to an exemplary embodiment of the present invention.

With reference to FIG. 17, a user equipment 1700 includes a controller 1710, a transmitter 1720, and a receiver 1730.

In FIG. 17, the user equipment 1700 uses a CA technology for performing communication with transmission/reception points by using a plurality of CCs associated with PCells and SCells. The TDD UL-DL configuration of the PCell and the TDD UL-DL configuration of the SCell may be different from each other.

The receiver 1730 may receive the reference TDD configuration information or the SCell reference TDD configuration information from the transmission/reception point through RRC or PDCCH.

The controller 1710 extracts information on uplink subframes (timings) for transmitting PDSCH A/N with respect to a PDSCH transmission on a downlink subframe and information on the downlink subframe in which the PDSCH is transmitted from the received reference TDD configuration information or the SCell reference TDD configuration information. The information to be extracted can be extracted using the received reference TDD configuration information or the SCell reference TDD configuration information and Table 2.

If the receiver 1730 receives PDSCH, the controller 1710 generates an ACK/NACK signal representing reception success/failure for the PDSCH transmission, and controls the transmitter 1720 to transmit the ACK/NACK signal through the PCell in the scheduled subframe (timing) so that the generated A/N (ACK/NACK signal) for the PDSCH may be transmitted.

In the illustrated exemplary embodiments, a description is made so that the transmission/reception point selects a reference TDD configuration specific to the user equipment from the one or more possible reference TDD configurations and transmits the selected information to the user equipment.

However, it is possible to select the reference TDD configuration specific to the user equipment or the SCell reference TDD configuration from one or more possible reference TDD configurations or SCell reference TDD configurations according to rules defined in advance by each of the transmission/reception point and the user equipment. In such a case, the reference TDD configuration information or the SCell reference TDD configuration information may not be transmitted between the transmission/reception point and the user equipment.

Further, it is possible to configure in advance a table including only one reference TDD configuration from among one or more possible reference TDD configurations (or only one SCell reference TDD configuration from among one or more possible SCell reference TDD configurations) for each TDD UL-DL configuration pair of the PCell and the SCell. That is, it is possible to set a configuration in advance in which one reference TDD configuration or one SCell reference TDD configuration will be used for each TDD UL-DL configuration pair of the PCell and the SCell. For example, if the TDD UL-DL configuration of the PCell in Table 3 is 0, and the TDD UL-DL configuration of the SCell is 1, it is indicated that reference TDD configurations 1, 2, 4, and 5 are possible as a reference TDD configuration, but one value configured in advance among the possible values can be shown in the tables stored in the transmission/reception point and the user equipment. In such a case, the reference TDD configuration information may not be transmitted between the transmission/reception point and the user equipment.

Further, if the TDD UL-DL configuration of the PCell and the TDD UL-DL configuration of the SCell are different from each other, it may be defined in advance that a certain value (for example, the TDD UL-DL configuration 5) can be used for the reference TDD configuration or the SCell reference TDD configuration. In such a case, the reference TDD configuration information may not be transmitted between the transmission/reception point and the user equipment.

In the illustrated exemplary embodiments, a description is made of a case in which one TDD UL-DL configuration of the PCell and one UL-DL configuration of the SCell are different from each other.

Meanwhile, a consideration may be made on a case in which the TDD UL-DL configuration of the PCell and a plurality of UL-DL configurations of the SCell, that is, three or more TDD UL-DL configurations, are different from each other.

In such a case, the transmission/reception point compares the three or more TDD UL-DL configurations in the operation S610 of FIG. 6 as described above, and searches for one or more common uplink subframes from the three or more TDD UL-DL configurations in the operation S620, and identifies one or more reference TDD configurations that satisfy a condition that a set including uplink subframes of a reference TDD configuration for a PDSCH transmission is a subset of a set including the common uplink subframes in the operation S630. The transmission/reception point and/or the user equipment may include in advance a table that shows the results obtained by the operations described above. Further, the common uplink subframes may be respectively obtained by identifying common uplink subframes between the PCell and each SCell and the common uplink subframes between the PCell and an SCell may be applied for the corresponding SCell, respectively.

Further, for PDSCH received from three or more CCs, the user equipment can transmit PDSCH A/N through uplink subframes of the PCell based on the reference TDD configuration received from the transmission/reception point or predefined in the user equipment.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A user equipment configured with at least two serving cells, wherein said at least two serving cells comprise a primary cell (PCell) and a secondary cell (SCell), the PCell and the SCell having different Time Division Duplex (TDD) Uplink-Downlink (UL-DL) configurations, the user equipment comprising:
   a receiver configured to receive a physical downlink shared channel (PDSCH) transmission on the SCell in a subframe 'n-$k_i$';
   a controller configured to determine a reference TDD configuration for the SCell, the reference TDD configuration for the SCell being determined based on a PCell TDD UL-DL configuration and SCell TDD UL-DL configuration pair in Table 1-1 below:

TABLE 1-1

| Reference TDD configuration | (PCell TDD UL-DL configuration, SCell TDD UL-DL configuration) |
|---|---|
| 1 | (1, 0), (1, 6), (0, 1), (6, 1) |
| 2 | (2, 0), (2, 1), (2, 6), (0, 2), (1, 2), (6, 2) |
| 3 | (3, 0), (3, 6), (0, 3), (6, 3) |
| 4 | (4, 0), (4, 1), (4, 3), (4, 6), (0, 4), (1, 4), (3, 4), (6, 4), (3, 1), (1, 3) |
| 5 | (5, 0), (5, 1), (5, 2), (5, 3), (5, 4), (5, 6), (0, 5), (1, 5), (2, 5), (3, 5), (4, 5), (6, 5), (3, 2), (4, 2), (2, 3), (2, 4) |
| 6 | (6, 0), (0, 6) | a transmitter configured to transmit a first acknowledgment/negative acknowledgment (A/N) in an uplink subframe 'n', the first A/N transmitted in the uplink subframe 'n' being responsive the PDSCH transmission received in the subframe 'n-$k_i$',
   wherein n, k and i are integers, $k_i \in K$, a downlink set K for each reference TDD configuration being defined in Table 1-2, $0 \le i \le M-1$, M is the number of elements in the downlink association set K.

TABLE 1-2

| Reference TDD configuration | Downlink association set index K: {$k_0, k_1 \ldots k_{M-1}$} for TDD Subframe 'n' | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |

TABLE 1-2-continued

| Reference TDD configuration | Downlink association set index K: {$k_0, k_1 \ldots k_{M-1}$} for TDD Subframe 'n' | | | | | | | | | |
|---|---|---|---|---|---|---|---|---|---|---|
| | 0 | 1 | 2 | 3 | 4 | 5 | 6 | 7 | 8 | 9 |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

2. The user equipment of claim 1, wherein the transmitter is configured to transmit a second A/N in an uplink subframe determined by a reference TDD configuration for the PCell, the second A/N being responsive to a PDSCH transmission on the PCell,
   wherein the reference TDD configuration for the PCell is the PCell TDD UL-DL configuration.

3. A method for transmitting acknowledgement/negative acknowledgement (A/N) by a user equipment configured with at least two serving cells comprising a primary cell (PCell) and a secondary cell (SCell), the PCell and the SCell having different Time Division Duplex (TDD) Uplink-Downlink (UL-DL) configurations, the method comprising:
   receiving a physical downlink shared channel (PDSCH) transmission on the SCell in a subframe 'n-$k_i$';
   determining a reference TDD configuration for the SCell, the reference TDD configuration fir the SCell being determined based on a PCell TDD UL-DL configuration and SCell TDD UL-DL configuration pair in Table 3-1 below:

TABLE 3-1

| Reference TDD configuration | (PCell TDD UL-DL configuration, SCell TDD UL-DL configuration) |
|---|---|
| 1 | (1, 0), (1, 6), (0, 1), (6, 1) |
| 2 | (2, 0), (2, 1), (2, 6), (0, 2), (1, 2), (6, 2) |
| 3 | (3, 0), (3, 6), (0, 3), (6, 3) |
| 4 | (4, 0), (4, 1), (4, 3), (4, 6), (0, 4), (1, 4), (3, 4), (6, 4), (3, 1), (1, 3) |
| 5 | (5, 0), (5, 1), (5, 2), (5, 3), (5, 4), (5, 6), (0, 5), (1, 5), (2, 5), (3, 5), (4, 5), (6, 5), (3, 2), (4, 2), (2, 3), (2, 4) |
| 6 | (6, 0), (0, 6) | transmitting a first acknowledgment/negative acknowledgment (A/N) in an uplink subframe 'n', the first A/N transmitted in the uplink subframe 'n' being responsive the PDSCH transmission received in the subframe 'n-$k_i$',
   wherein n, k and i are integers, $k_i \in K$, a downlink set K for each reference TDD configuration being defined in Table 3-2, $0 \le i \le M-1$, M is the number of elements in the downlink association set K.

TABLE 3-2

| Reference TDD configuration | Downlink association set index K: {k₀, k₁ ... k_{M-1}} for TDD Subframe 'n' | | | | | | | | |
|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

4. The method of claim 3, further comprising:
transmitting a second A/N in an uplink subframe determined by a reference TDD configuration for the PCell, the second A/N being responsive to a PDSCH transmission on the PCell,
wherein the reference TDD configuration for the PCell is the PCell TDD UL-DL configuration.

5. A transmission/reception facility that communicates with a user equipment configured with at least two serving cells comprising a primary cell (PCell) and a secondary cell (SCell), the PCell and the SCell having different Time Division Duplex (TDD) Uplink-Downlink (UL-DL) configurations, the transmission/reception facility comprising:

a controller configured to determine a reference TDD configuration for the SCell, the reference TDD configuration for the SCell being determined based on a PCell TDD UL-DL configuration and SCell TDD UL-DL configuration pair in Table 5-1 below:

TABLE 5-1

| Reference TDD configuration for SCell | |
|---|---|
| Reference TDD configuration | (PCell TDD UL-DL configuration, SCell TDD UL-DL configuration) |
| 1 | (1, 0), (1, 6), (0, 1), (6, 1) |
| 2 | (2, 0), (2, 1), (2, 6), (0, 2), (1, 2), (6, 2) |
| 3 | (3, 0), (3, 6), (0, 3), (6, 3) |
| 4 | (4, 0), (4, 1), (4, 3), (4, 6), (0, 4), (1, 4), (3, 4), (6, 4), (3, 1), (1, 3) |
| 5 | (5, 0), (5, 1), (5, 2), (5, 3), (5, 4), (5, 6), (0, 5), (1, 5), (2, 5), (3, 5), (4, 5), (6, 5), (3, 2), (4, 2), (2, 3), (2, 4) |
| 6 | (6, 0), (0, 6) | a receiver configured to receive a first acknowledgment/negative acknowledgment (A/N) from the user equipment in an uplink subframe 'n', the first A/N transmitted in the unlink subframe 'n' being responsive a PDSCH transmission in the subframe 'n−k_i',
wherein n, k and i are integers, $k_i \in K$, a downlink set K for each reference TDD configuration being defined in Table 5-2, $0 \leq i \leq M-1$, M is the number of elements in the downlink association set K.

TABLE 5-2

| Reference TDD configuration | Downlink association set index K: {k₀, k₁ ... k_{M-1}} for TDD Subframe 'n' | | | | | | | | |
|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

6. The transmission/reception facility of claim 5, wherein the receiver is configured to receive a second A/N from the user equipment in an uplink subframe determined by a reference TDD configuration for the PCell, the second A/N being responsive to a PDSCH transmission on the PCell,
wherein the reference TDD configuration for the PCell is the PCell TDD UL-DL configuration.

7. A method for receiving acknowledgement/negative acknowledgement (A/N) by a transmission/reception facility that communicates with user equipment configured with at least two serving cells comprising a primary cell (PCell) and a secondary cell (SCell), the PCell and the SCell having different Time Division Duplex (TDD) Uplink-Downlink (UL-DL) configurations, the method comprising:
determining a reference TDD configuration for the SCell, the reference TDD configuration for the SCell being determined based on a PCell TDD UL-DL configuration and SCell TDD UL-DL configuration pair in Table 7-1 below:

TABLE 7-1

| Reference TDD configuration for SCell | |
|---|---|
| Reference TDD configuration | (PCell TDD UL-DL configuration, SCell TDD UL-DL configuration) |
| 1 | (1, 0), (1, 6), (0, 1), (6, 1) |
| 2 | (2, 0), (2, 1), (2, 6), (0, 2), (1, 2), (6, 2) |

TABLE 7-1-continued

| Reference TDD configuration for SCell | |
|---|---|
| Reference TDD configuration | (PCell TDD UL-DL configuration, SCell TDD UL-DL configuration) |
| 3 | (3, 0), (3, 6), (0, 3), (6, 3) |
| 4 | (4, 0), (4, 1), (4, 3), (4, 6), (0, 4), (1, 4), (3, 4), (6, 4), (3, 1), (1, 3) |
| 5 | (5, 0), (5, 1), (5, 2), (5, 3), (5, 4), (5, 6), (0, 5), (1, 5), (2, 5), (3, 5), (4, 5), (6, 5), (3, 2), (4, 2), (2, 3), (2, 4) |
| 6 | (6, 0), (0, 6) | receiving a first acknowledgment/negative acknowledgment (A/N) from the user equipment in an uplink subframe 'n', the first A/N transmitted in the uplink subframe 'n' being responsive a PDSCH transmission in the subframe 'n−$k_i$', wherein n, k and i are integers, $k_i \in K$, a downlink set K for each reference TDD configuration being defined in Table 7-2, $0 \leq i \leq M-1$, M is the number of elements in the downlink association set K.

TABLE 7-2

| | Downlink association set index K: {$k_0, k_1 \ldots k_{M-1}$} for TDD | | | | | | | | | |
|---|---|---|---|---|---|---|---|---|---|---|
| Reference TDD | Subframe 'n' | | | | | | | | | |
| configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

8. The method of claim 7, further comprising:
receiving a second A/N from the user equipment in an uplink subframe determined by a reference TDD configuration for the PCell, the second A/N being responsive to a PDSCH transmission on the PCell,
wherein the reference TDD configuration for the PCell is the PCell TDD UL-DL configuration.

* * * * *